US012206212B2

(12) United States Patent
Masaki et al.

(10) Patent No.: US 12,206,212 B2
(45) Date of Patent: Jan. 21, 2025

(54) ELECTRICAL CONNECTOR

(71) Applicant: Hirose Electric Co., Ltd., Kanagawa (JP)

(72) Inventors: Shingo Masaki, Kanagawa (JP); Shoichi Mizusawa, Kanagawa (JP)

(73) Assignee: HIROSE ELECTRIC CO., LTD., Kanagawa (JP)

(*) Notice: Subject to any disclaimer, the term of this patent is extended or adjusted under 35 U.S.C. 154(b) by 338 days.

(21) Appl. No.: 17/877,092

(22) Filed: Jul. 29, 2022

(65) Prior Publication Data

US 2023/0033076 A1 Feb. 2, 2023

(30) Foreign Application Priority Data

Jul. 30, 2021 (JP) ................................ 2021-125765

(51) Int. Cl.
*H01R 24/60* (2011.01)
*H01R 12/70* (2011.01)
(Continued)

(52) U.S. Cl.
CPC ........... *H01R 24/60* (2013.01); *H01R 12/707* (2013.01); *H01R 12/716* (2013.01); *H01R 13/2442* (2013.01)

(58) Field of Classification Search
CPC ........ H01R 24/60; H01R 24/58; H01R 35/00; H01R 35/002; H01R 12/91; H01R 12/88;
(Continued)

(56) References Cited

U.S. PATENT DOCUMENTS 7,140,896 B2 * 11/2006 Takai .................. H01R 13/193 439/495
7,300,304 B1 * 11/2007 Takashita ............... H01R 12/88 439/495
(Continued)

FOREIGN PATENT DOCUMENTS

JP H08335469 A 12/1996
JP H1131561 A 2/1999
(Continued)

*Primary Examiner* — Harshad C Patel
(74) *Attorney, Agent, or Firm* — Procopio, Cory, Hargreaves & Savitch LLP

(57) ABSTRACT

Terminals have a retained portion located forwardly of a receiving space and retained in a housing, and a contact arm portion that extends toward the rear from the retained portion; a contact arm portion has a contact portion that protrudes toward the receiving space in the connector thickness direction perpendicular to the forward-backward direction and the terminal array direction and is capable of contacting the counterpart connect body; a contact portion faces the interior surface of the receiving space across a gap in the connector thickness direction; the terminals have an extension portion located forwardly of the contact portion; the extension portion has a reflective portion in the rear end portion thereof; the reflective portion has a rear end face within a range that includes the protruding end of the contact portion when viewed from the rear; and the rear end face is formed as a reflecting surface.

7 Claims, 8 Drawing Sheets

(51) Int. Cl.
*H01R 12/71* (2011.01)
*H01R 13/24* (2006.01)

(58) Field of Classification Search
CPC .. H01R 12/716; H01R 12/714; H01R 12/712; H01R 12/71; H01R 12/707
See application file for complete search history.

(56) References Cited

U.S. PATENT DOCUMENTS

| | | | | |
|---|---|---|---|---|
| 7,311,542 B2 * | 12/2007 | Suzuki | H01R 12/78 | 439/495 |
| 7,445,495 B2 * | 11/2008 | Takashita | H01R 12/67 | 439/495 |
| 7,452,227 B2 * | 11/2008 | Matoba | H01R 12/88 | 439/495 |
| 7,540,764 B2 * | 6/2009 | Suzuki | H01R 12/79 | 439/495 |
| 7,677,917 B2 * | 3/2010 | Hemmi | H01R 12/88 | 439/495 |
| 7,766,694 B2 * | 8/2010 | Tanaka | H01R 12/88 | 439/495 |
| 7,931,491 B2 * | 4/2011 | Takahashi | H01R 4/028 | 439/495 |
| 8,616,906 B2 * | 12/2013 | Lijima | H01R 12/88 | 439/495 |
| 9,871,306 B2 * | 1/2018 | Mizusawa | H01R 12/88 | |
| 10,181,661 B2 * | 1/2019 | Manba | H01R 12/774 | |
| 10,868,374 B2 * | 12/2020 | Mizusawa | H01R 12/774 | |
| 2007/0032115 A1 * | 2/2007 | Takashita | H01R 12/88 | 439/260 |
| 2023/0030550 A1 * | 2/2023 | Masaki | H01R 12/774 | |

FOREIGN PATENT DOCUMENTS

| | | |
|---|---|---|
| JP | 2004206987 A | 7/2004 |
| JP | 2005079058 A | 3/2005 |
| JP | 2009016358 A | 1/2009 |
| JP | 2012212658 A | 11/2012 |

* cited by examiner (B)

(C)

(B)

(C)

(B)

(C)

(A)

(B)

ELECTRICAL CONNECTOR

CROSS-REFERENCE TO RELATED APPLICATIONS

This application claims priority to Japanese Patent Application No. 2021-125765, filed Jul. 30, 2021, the contents of which are incorporated herein by reference in its entirety for all purposes.

BACKGROUND

Technical Field

The present invention relates to an electrical connector.

Background Art

An electrical connector, to which a counterpart connect body is connected such that the direction of insertion and extraction is the forward-backward direction, has been disclosed in Patent Document 1. According to Patent Document 1, a flat-type conductor (signal transmission medium) used as a strip-shaped counterpart connect body that extends in the forward-backward direction and is dimensionally thick in the up-down direction, is connected to the connector by insertion in the forward direction. Although the description of Patent Document 1 assumes that the direction of insertion of the flat-type conductor is toward the rear and the direction of extraction is toward the front, the description herein assumes that the direction of insertion of the flat-type conductor is toward the front and the direction of extraction isward the rear. The connector of Patent Document 1, which is mounted to the mounting face of a circuit board, has a multiple terminals, which are arranged such that the terminal array direction is the strip width direction of the flat-type conductor, retained in place within a housing. A receiving space for receiving the flat-type conductor is formed in the housing between its top and bottom walls so as to be rearwardly open.

The terminals, which are made by bending metal strip-shaped pieces in the through-thickness direction, each have a base portion that extends in the up-down direction, a flexible arm portion that extends toward the rear from the top end of the said base portion, and a board connection portion that extends forwardly from the bottom end of the base portion. Said terminals are attached to the housing from the front and are solder-connected to the mounting face of the circuit board with their board connection portions. A contact portion (raised terminal contact portion) that protrudes downwardly toward the receiving space and faces the top face of the bottom wall of the housing is formed in the rear end portion of the flexible arm portion. Said contact portion is adapted for resiliently contacting, from above, the flat-type conductor inserted into the above-mentioned receiving space.

RELATED ART DOCUMENTS

Patent Documents

[Patent Document 1]

Japanese Published Patent Application No. 2012-212658.

SUMMARY

Problems to be Solved

In the connector of Patent Document 1, the ease of insertion of the flat-type conductor and the state of contact between the contact portions and the flat-type conductor are greatly dependent on the relative size of the dimensions of the gap used for entry of the flat-type conductor at the location of the terminals in the terminal array direction. If the terminals are provided with protruding sections that protrude into the receiving space, the location of the protruding ends of the above-mentioned protruding sections in the up-down direction defines the dimensions of the above-mentioned gap. Therefore, it is extremely important to accurately identify the location of the protruding sections in the up-down direction, and manufactured connectors are often subject to inspections in order to identify the location of the above-mentioned protruding sections. The inspections are performed, for example, by emitting light into the above-mentioned receiving space from the rear and capturing images of the light's reflection from the rear. When the connector of Patent Document 1 is subjected to such an inspection, the location of the contact portions is identified based on the difference in brightness (contrast) between light reflected by the contact portions that protrude into the receiving space and light reflected by the interior of the receiving space in the captured images.

Typically, terminal contact portions often have inclined faces formed at the rear ends for guiding the flat-type conductor, in which case light emitted forward is unlikely to be reflected rearward by said inclined faces. In addition, in recent years, there is a strong demand for connector miniaturization and, thus, the rear end opening of the receiving space is often made to be small. If the rear end opening of the receiving space is small, then even if light is emitted into the receiving space from the rear at the time of inspection, a sufficient quantity of light is unlikely to reach the interior of the receiving space, i.e., locations forward of the terminal contact portions, and in such a case it is still necessary to ensure that light is readily reflected rearward by the above-mentioned interior. However, depending on the shape and location of the sections reflecting light in the interior of the receiving space, it is not always possible for light that reaches the interior to be reflected rearward, in which case it may be impossible to obtain a sufficient quantity of reflected light. Therefore, if a sufficient quantity of reflected light cannot be obtained, the images taken of the contact portions and those of the interior of the receiving space are both dark, which makes it impossible to capture clear images and thus difficult to identify the location of the contact portions during inspection.

In view of the above circumstances, it is an object of the present invention to provide an electrical connector capable of clearly identifying the location of the protruding ends of protruding sections, such as terminal contact portions and the like.

Technical Solution

In accordance with the present invention, the above-described problem is solved by electrical connectors according to the following first through third inventions.

The electrical connectors according to the first through third inventions, which are electrical connectors to which a counterpart connect body is forwardly connected such that the direction of insertion and extraction is the forward-backward direction, comprise a housing having formed therein a receiving space open toward the rear for receiving the counterpart connect body, and multiple terminals that are arranged and retained in the housing such that the terminal array direction is a direction perpendicular to the forward-backward direction.

<First Invention>

In the first invention, the terminals have a retained portion located forwardly of the receiving space and retained in the housing and a contact arm portion that extends toward the rear from the retained portion, the contact arm portion has a contact portion that protrudes toward the receiving space in the connector thickness direction perpendicular to the forward-backward direction and the terminal array direction and is capable of contacting the counterpart connect body, said contact portion faces the interior surface of the receiving space across a gap in the connector thickness direction, the terminals have an extension portion located forwardly of the contact portion, the extension portion has a reflective portion in the rear end portion thereof, the reflective portion has a rear end face within a range that includes the protruding end of the contact portion when viewed from the rear, and the rear end face is formed as a reflecting surface capable of rearwardly reflecting light emitted forwardly toward the receiving space.

In the first invention, the reflecting surfaces of the reflective portions of the terminals are located within a range that includes the protruding ends of the contact portions when viewed from the rear, and when the electrical connector is inspected, light emitted forwardly toward the receiving space is reflected rearward by the reflecting surfaces of the reflective portions. In the first invention, the reflective portions are formed in the rear end portions of the extension portions located forwardly of the contact portions. Here, if the reflective portions are disposed at locations proximal to the contact portions in the forward-backward direction, it becomes possible to dispose the reflecting surfaces of said reflective portions at locations proximal to the contact portions in the forward-backward direction. In other words, given the constraint that the reflecting surfaces are disposed forwardly of the contact portions, the reflecting surfaces can be disposed as rearwardly as possible, that is, at locations proximal to the rear end opening of the receiving space. Therefore, even if the rear end opening of the receiving space is small, light emitted forwardly toward the receiving space is likely to reach the reflecting surfaces and a sufficient quantity of light can be reflected rearward by the reflecting surfaces. As a result, it becomes easy to clearly identify the location of the contact portions by capturing clear inspection images with high contrast between the contact portions and the reflecting surfaces.

In the first invention, the reflecting surfaces may be formed within a range which, in addition to overlapping with the gap in the connector thickness direction, also includes the location of the interior surface of the receiving space that faces the contact portion. Forming the reflecting surfaces within such a range positions the reflecting surfaces in a manner that ensures inclusion of the location of the interior surface of the above-mentioned receiving space in the connector thickness direction when viewed from the rear, thereby making it easier to capture clear inspection images of the gap formed between the above-mentioned contact portions and the above-mentioned interior surface and thus allowing for the dimensions of the above-mentioned gap to be accurately measured.

<Second Invention>

In the second invention, the terminals have two arm portions and strut portions with major faces perpendicular to the terminal array direction, the two arm portions are located so as to sandwich the receiving space in the connector thickness direction perpendicular to the forward-backward direction and the terminal array direction and extend in the forward-backward direction in parallel with each other, the strut portions extend in the connector thickness direction at locations forward of the receiving space and couple the two arm portions, at least one arm portion has a protrusion that protrudes toward the receiving space, at least one protrusion is a contact portion capable of contacting the counterpart connect body, either one of the arm portions has a reflective portion that protrudes toward the receiving space at a location forward of the protrusion, the reflective portion has a rear end face within a range that includes the protruding end of the at least one protrusion when viewed from the rear, and the rear end face is formed as a reflecting surface capable of rearwardly reflecting light emitted forwardly toward the receiving space.

In the second invention, in the same manner as in the first invention, when the electrical connector is inspected, light emitted forwardly toward the receiving space is also reflected rearward by the reflecting surfaces of the reflective portions. Since in the second invention the reflective portions are provided in the arm portions of the terminals, said reflective portions can be located in front of the protrusions in close proximity to said protrusions. In other words, given the constraint that the reflecting surfaces are disposed forwardly of the protrusions, the reflecting surfaces can be disposed as rearwardly as possible, that is, at locations proximal to the rear end opening of the receiving space. Therefore, in the same manner as in the first invention, light emitted forwardly toward the receiving space is likely to reach the reflecting surfaces and a sufficient quantity of light can be reflected rearward by the reflecting surfaces. As a result, it becomes easy to clearly identify the location of the protrusions by capturing clear inspection images.

In the second invention, the protrusions are formed in each of the two arm portions, such that one arm that has the reflective portion, in addition to having a recess portion open toward the receiving space, may have the reflective portion at the location of the front end of the recess portion and may have the protrusion at the location of the rear end of the recess portion, and the other arm portion may have the protrusion within the bounds of the recess portion in the forward-backward direction. With such a configuration of the terminals, a reflective portion formed in one arm portion is located in front of the protrusion formed in the one arm portion and the protrusion formed in the other arm portion, in close proximity to these protrusions. In other words, given the constraint that the reflecting surfaces are disposed forwardly of the protrusions, the reflecting surfaces can be disposed as rearwardly as possible, that is, at locations proximal to the rear end opening of the receiving space. Therefore, in the same manner as in the first invention, light emitted forwardly toward the receiving space is likely to reach the reflecting surfaces and a sufficient quantity of light can be reflected rearward by the reflecting surfaces. As a result, it becomes easy to clearly identify the location of the protrusions with protruding ends located within the bounds of the above-mentioned reflecting surfaces by means of capturing inspection images.

In the first and second inventions, the reflecting surfaces may be formed as surfaces perpendicular to the forward-backward direction. As a result of making the reflecting surfaces perpendicular to the forward-backward direction in this manner, light emitted forwardly toward the receiving space can be better reflected rearward by the reflecting surfaces of the reflective portions, which makes it easier to capture clear inspection images.

<Third Invention>

In the third invention, the terminals have a base portion located forwardly of the receiving space and a contact arm portion that extends toward the rear from the base portion, the contact arm portion has a contact portion that protrudes toward the receiving space in the connector thickness direction perpendicular to the forward-backward direction and the terminal array direction and is capable of contacting the counterpart connect body, the contact portion faces the interior surface of the receiving space across a gap in the connector thickness direction, the housing has formed therein a front space that is located forwardly of the receiving space and is in communication with the receiving space, the front space has an opening portion open to the receiving space on the side opposite to the contact portion in the connector thickness direction and that communicates with the exterior through the opening portion, the housing or the terminals have a reflective portion at a location overlapping with the opening portion when viewed through said opening portion, the reflective portion has an inclined face inclined so as to approach the opening portion as one moves forward within a range that includes the protruding end of the contact portion when viewed from the rear, and the inclined face is formed as a reflecting surface capable of rearwardly reflecting light emitted into the opening portion.

In an electrical connector into which a counterpart connect body is inserted, dimensions in the connector thickness direction are often made smaller than dimensions in the forward-backward direction, in which the counterpart connect body is connected. In the third invention, the opening portion into which light is emitted is open in the connector thickness direction, and the distance from the opening portion to the reflecting surface of the reflective portion in the connector thickness direction is shorter than the distance from the rear end opening of the receiving space to the reflecting surface of the reflective portion in the forward-backward direction. Therefore, at the time of inspection, light emitted into the opening portion in the connector thickness direction is likely to reach the reflecting surface in sufficient quantities and be reflected rearward by said reflecting surface forming the inclined face. In addition, the reflecting surface is located within a range that includes the protruding ends of the contact portions when viewed from the rear. Therefore, it becomes easy to identify the location of the contact portions by capturing clear inspection images with high contrast between the contact portions and the reflecting surface using an imaging device (imaging portion) disposed behind the connector.

In the third invention, the reflecting surface may be formed within a range which, in addition to overlapping with the gap in the connector thickness direction, also includes the location of the interior surface of the receiving space that faces the contact portion. In the same manner as in the first invention, forming the reflecting surface within such a range positions the reflecting surface in a manner that ensures inclusion of the location of the interior surface of the above-mentioned receiving space in the connector thickness direction when viewed from the rear, thereby making it easier to capture clear inspection images of the gap formed between the above-mentioned contact portions and the above-mentioned interior surface and thus allowing for the dimensions of the above-mentioned gap to be accurately measured.

Technical Effect

In the present invention, as described above, clear inspection images can be captured and the location of the contact portions can be easily identified due to the fact that light emitted from outside the connector is adequately reflected rearward by the reflecting surfaces of the reflective portions located within a range that includes the protruding ends of the contact portions when viewed from the rear.

DETAILED DESCRIPTION

Embodiments of the present invention will be discussed hereinbelow with reference to the accompanying drawings.

First Embodiment

Figure 1:
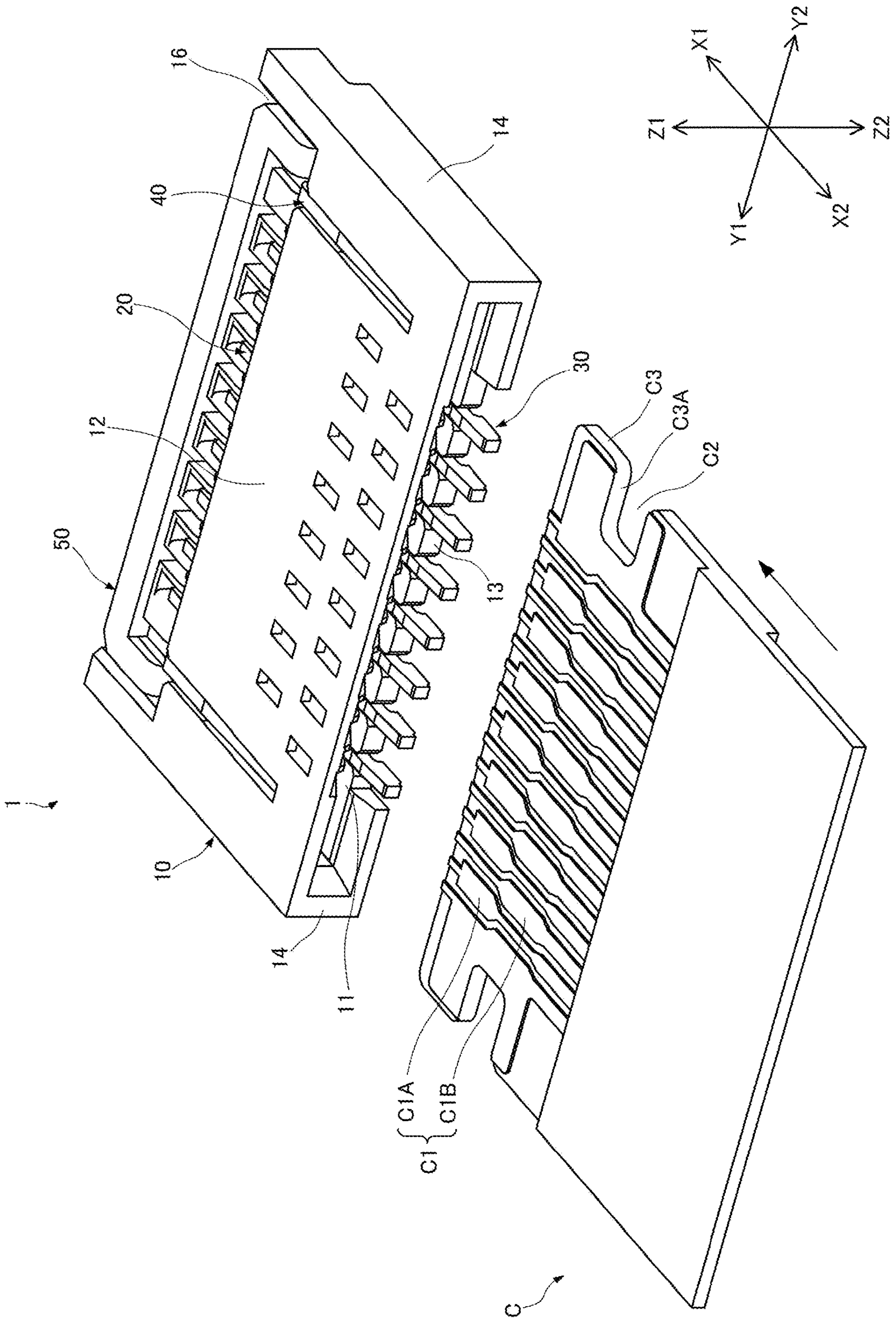
FIG. 1 illustrates a perspective view illustrating an electrical connector for flat-type conductors according to the first embodiment of the present invention, shown along with a flat-type conductor.
Figure 2:
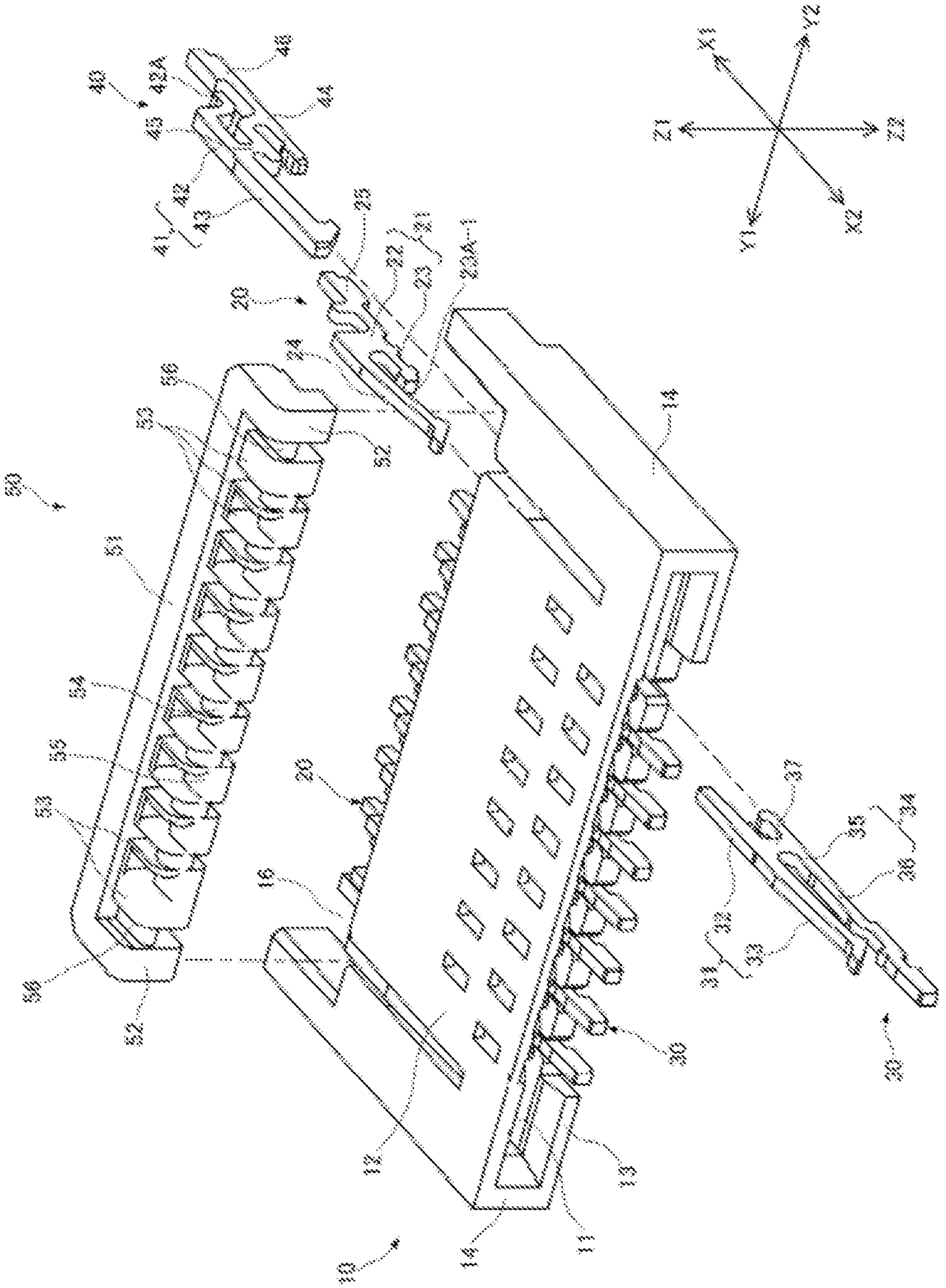
FIG. 2 illustrates a perspective view illustrating the electrical connector for flat-type conductors, with one first terminal, one second terminal, a locking member, and a movable member shown in an exploded condition.
Figure 3A:
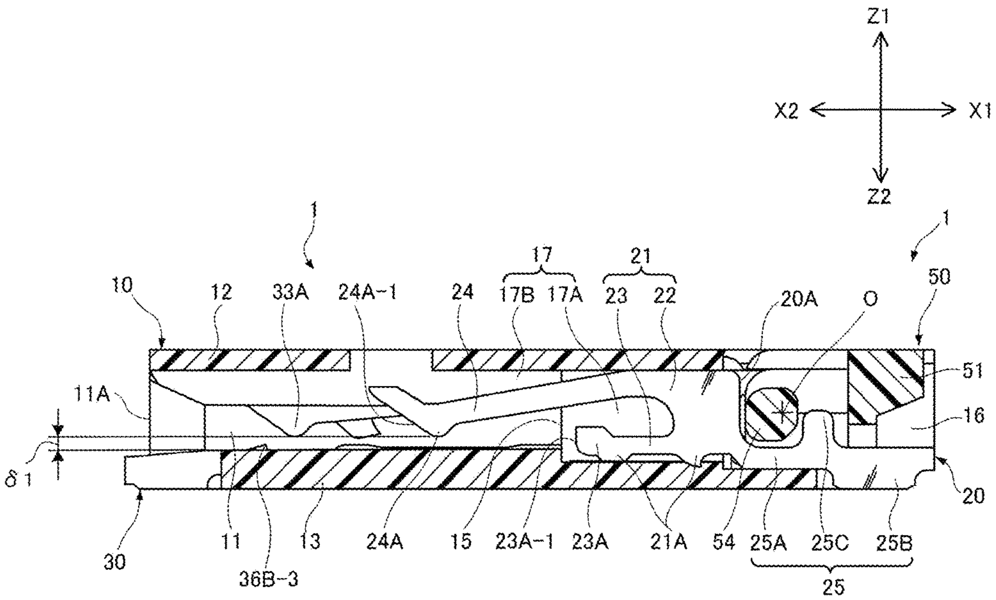
FIGS. 3 (A) to 3 (C) illustrate a longitudinal cross-sectional view of the electrical connector for flat-type conductors, wherein FIG. 3 (A) illustrates a cross-section at the location of a first terminal, FIG. 3 (B) a cross-section at the location of a second terminal, and FIG. 3 (C) a cross-section at the location of a locking member.
Figure 3B:
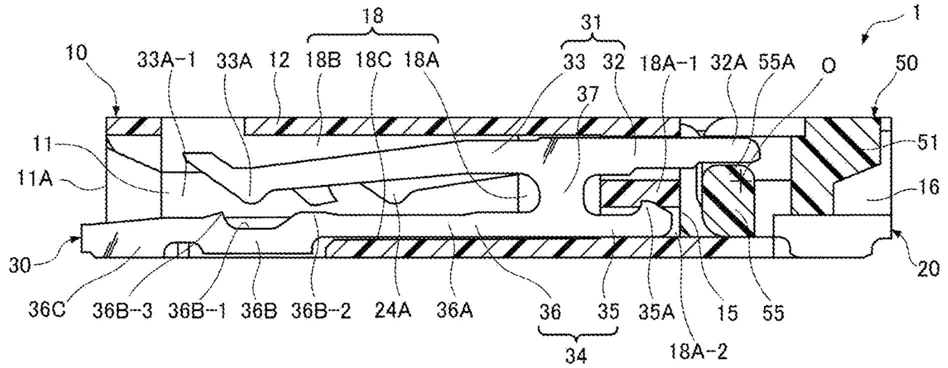
Figure 3C:
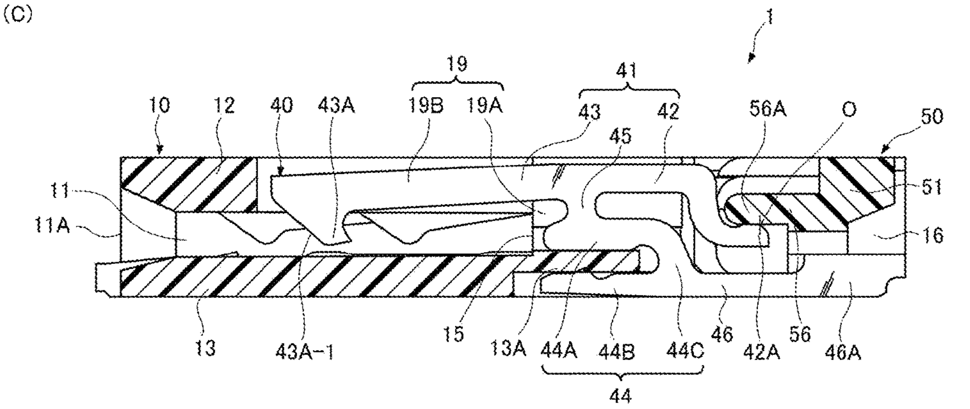

FIG. 1 is a perspective view of the electrical connector for flat-type conductors 1 (hereinafter referred to as "connector 1") according to the present embodiment. FIG. 2 is a perspective view illustrating the connector 1, with one first terminal 20, one second terminal 30, a locking member 40, and a movable member 50 shown in an exploded condition. FIGS. 3 (A) to 3 (C) show longitudinal cross-sectional views of the connector 1, wherein FIG. 3 (A) illustrates a cross-section at the location of a first terminal 20, FIG. 3 (B) a cross-section at the location of a second terminal 30, FIG. 3 (C) a cross-section at the location of a locking member 40.

The connector 1 is mounted to a mounting face on a circuit board (not shown), and a flat-type conductor C (e.g., FPC) serving as a counterpart connect body, is adapted to be connected thereto so as to permit insertion and extraction such that the direction of insertion and extraction is a forward-backward direction (X-axis direction) parallel to said mounting face. The connector 1 puts the circuit board and the flat-type conductor C in electrical communication when the flat-type conductor C is connected. In the present embodiment, in the X-axis direction (forward-backward direction), direction X1 is toward the front and direction X2 is toward the rear. In addition, the connector width direction is the Y-axis direction, which is perpendicular to the forward-backward direction (X-axis direction) in a plane (XY plane) parallel to the mounting face of the circuit board, and the connector thickness direction is the Z-axis direction (up-down direction), which is perpendicular to the mounting face of the circuit board.

The flat-type conductor C, which extends in the forward-backward direction (X-axis direction) in the form of a flexible strip whose width direction is the connector width direction (Y-axis direction), has multiple circuits extending in the forward-backward direction formed in an array in the connector width direction. Said circuits are embedded within an insulating layer in the flat-type conductor C and extend in the forward-backward direction all the way to the front end of the flat-type conductor C. In addition, the above-mentioned circuits include connecting circuits C1 whose top face of the flat-type conductor C in its front end section is exposed, and can be brought into contact with first terminals 20 and second terminals 30 in the connector 1, to be described below. The connecting circuits C1 include first circuits CIA, which are in contact with the first terminals 20, and second circuits C1B, which are in contact with the second terminals 30, with the two types of circuits positioned alternately in the connector width direction while being offset in the forward-backward direction.

Further, the flat-type conductor C has cut-out portions C2 formed in the opposite side edges of the above-mentioned front end section, and the rear end edges of ears C3, which are located forwardly of said cut-out portions C2, operate as engageable portions C3A engaging the engaging portions 43A, to be described below, of the connector 1 (see FIG. 4 (C)).

The connector 1 comprises a housing 10 made of plastic or another electrically insulating material, multiple first terminals 20 and second terminals 30 of sheet metal arranged such that the terminal array direction is the connector width direction and retained in the housing 10, locking members 40 of sheet metal arranged on opposite external sides of the terminal array range in the connector width direction, and a movable member 50 made of plastic or another electrically insulating material that can pivot between a closed position and an open position, to be described below, and the flat-type conductor C is adapted to be inserted and connected thereto from the rear.

The housing 10, as shown in FIGS. 1, 2, has a substantially rectangular parallelepiped-like exterior configuration whose longitudinal direction is the connector width direction, and a receiving space 11 used to receive the flat-type conductor C is formed therein as a rearwardly open space. As shown in FIG. 2, the housing 10 has a top wall 12 and a bottom wall 13 that extend parallel to the mounting face of the circuit board, two side walls 14 that extend in the up-down direction and couple the opposite end portions of the top wall 12 and the bottom wall 13 in the connector width direction, and a front wall 15 that couples the front ends of the top wall 12 and the bottom wall 13 (see FIGS. 3 (A) to 3 (C)). A movable member accommodating space 16 for accommodating the movable member 50 is formed forwardly of the front wall 15 between the two side walls 14 in the connector width direction.

Figure 4A:
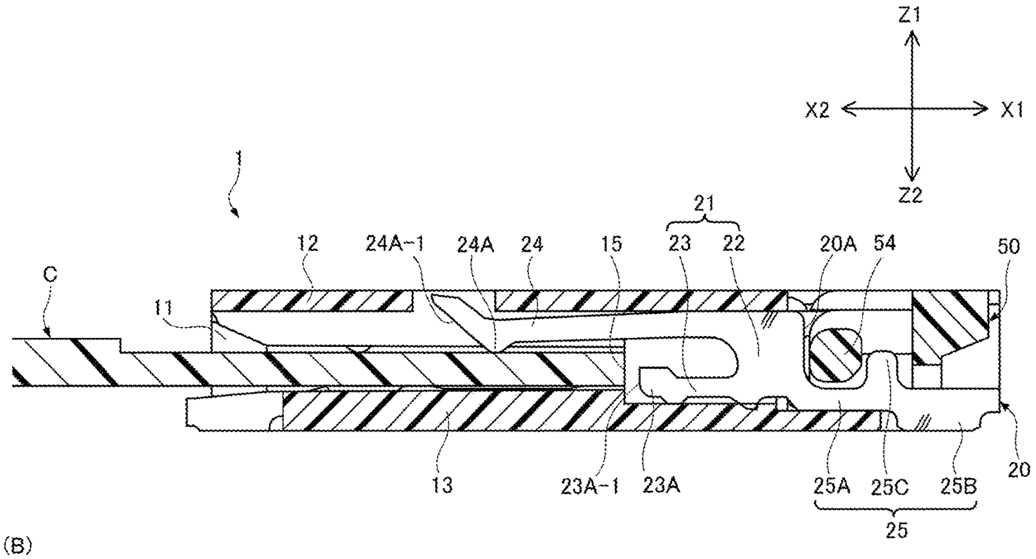
FIGS. 4 (A) to 4 (C) illustrate a longitudinal cross-sectional view of the electrical connector for flat-type conductors upon completion of insertion of the flat-type conductor, wherein FIG. 4 (A) illustrates a cross-section at the location of a first terminal, FIG. 4 (B) a cross-section at the location of a second terminal, and FIG. 4 (C) a cross-section at the location of a locking member.
Figure 4B:
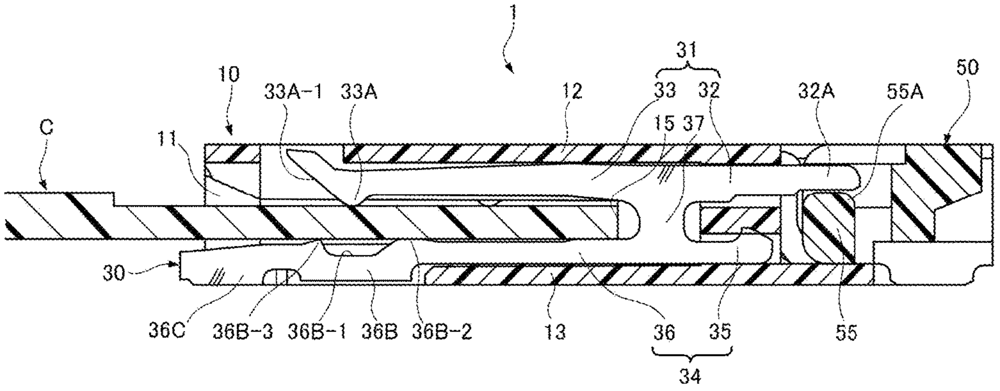
Figure 4C:
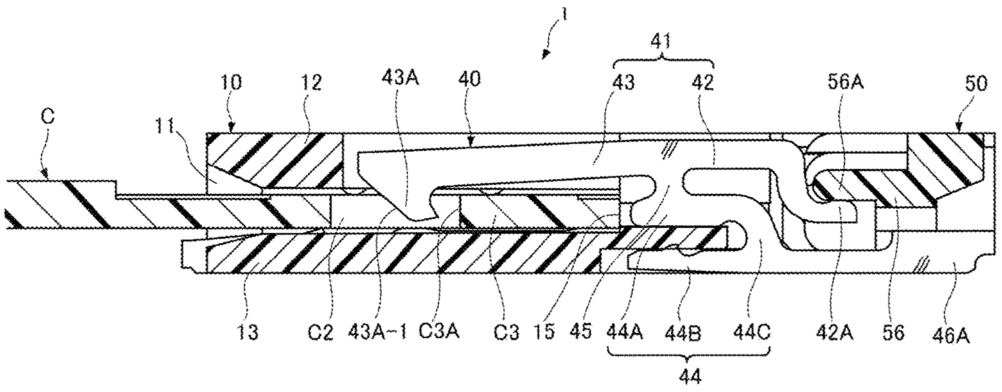

The receiving space 11, which has a rear end opening 11A that is enclosed by the top wall 12, the bottom wall 13, and the two side walls 14 and forms an insertion aperture for the flat-type conductor C (see FIGS. 3 (A) to 3 (C)) in the rear end face of the housing 10, is adapted to receive the front end section of the flat-type conductor C within a space extending from the rear end opening 11A to the rear face of the front wall 15 in the forward-backward direction (see FIGS. 4 (A) to 4 (C)).

Along with being in a face-to-face relationship with the mounting face of the circuit board at a location below the top wall 12, the bottom wall 13 has its rear end within the terminal array range in the connector width direction (Y-axis direction) positioned slightly forwardly of the rear end of the top wall 12 (see FIG. 1 and FIG. 2). In addition, within the terminal array range in the connector width direction, the bottom wall 13 has its front end portion projecting into the movable member accommodating space 16 (see FIGS. 3 (A) and 3 (B)). On the other hand, at locations corresponding to the locking members 40 outside the terminal array range in the connector width direction, the front end portion of the bottom wall 13 is positioned rearwardly of the front face of the front wall 15 (see FIG. 3 (C)). In addition, at a location corresponding to the locking member 40, the front end portion of the bottom wall 13 has its bottom face recessed, thereby making it thinner than other portions, and is formed as a mounting portion 13A used for mounting the locking member 40 (see FIG. 3 (C)).

In addition, as shown in FIGS. 3 (A) and 3 (B), a first terminal accommodating portion 17 for accommodating and retaining the first terminals 20 and a second terminal accommodating portion 18 for accommodating and retaining the second terminals 30 are formed in the housing 10. The first terminal accommodating portion 17 and second terminal accommodating portion 18 are arranged alternatingly at predetermined intervals in the connector width direction. In addition, as shown in FIG. 3 (C), locking member accommodating portions 19 for accommodating and retaining the locking members 40 are formed in the housing 10 at the opposite ends of the receiving space 11 in the connector width direction, in other words, on opposite external sides of the terminal array range.

As seen in FIG. 3 (A), the first terminal accommodating portion 17 has a front groove portion 17A serving as a front space that has a slit-shaped configuration extending at right angles to the connector width direction and is used for accommodating and retaining by press-fitting the front end section of the first contact arm portion 24 and the base portion 21, to be described below, of the first terminals 20, and an upper groove portion 17B that accommodates the rear end section of the first contact arm portion 24, to be described below, of the first terminals 20. The front groove portion 17A is formed to extend in the forward-backward direction within a range extending from the top wall 12 to the bottom wall 13 in the up-down direction. Recessed from the bottom face of the top wall 12, the upper groove portion 17B extends from the front groove portion 17A toward the rear. In addition, as seen in FIG. 3 (A), while being open toward the rear and downward, the upper groove portion 17B passes through the top wall 12 in the up-down direction at a location corresponding to the rear end portion of the first contact arm portion 24 in the forward-backward direction.

As seen in FIG. 3 (B), the second terminal accommodating portion 18 has a front groove portion 18A that has a slit-shaped configuration extending at right angles to the connector width direction and is used for accommodating and retaining by press-fitting the front end section of the lower arm portion 34, the front end section of the upper arm portion 31, and the strut portion 37, to be described below, of the second terminals 30, an upper groove portion 18B accommodating the rear end section of the upper arm portion 31, to be described below, of the second terminals 30, and a lower groove portion 18C accommodating the rear end section of the lower arm portion 34, to be described below, of the second terminals 30.

The front groove portion 18A is formed to pass in the forward-backward direction within a range extending from the top wall 12 to the bottom wall 13 in the up-down direction. As seen in FIG. 3 (B), within the front groove portion 18A, a second terminal retaining portion 18A-1 used for retaining the second terminal 30 by press-fitting is formed so as to couple the opposed interior groove surfaces (two surfaces facing each other in the connector width direction) of the front groove portion 18A at a vertically intermediate position in the front half of the front groove 18A. A press-fitting groove 18A-2 used for retaining the retained arm portion 35 by press-fitting is formed in the forward-backward direction between the second terminal retaining portion 18A-1 and the bottom wall 13. Recessed from the bottom face of the top wall 12, the upper groove portion 18B extends from the front groove portion 18A toward the rear. In addition, as seen in FIG. 3 (B), while being open toward the rear and downward, the upper groove portion 18B extends through the top wall 12 in the up-down direction at a location corresponding to the rear end portion of the upper arm portion 31 in the forward-backward direction. As seen in FIG. 3 (B), at a location proximate to the rear end, the lower groove portion 18C extends through the bottom wall 13 in the up-down direction at a location corresponding to the hereinafter-described reinforcing portion 36B of the lower arm portion 34.

As shown in FIG. 3 (C), the locking member accommodating portion 19 has a front groove portion 19A that has a slit-shaped configuration extending at right angles to the connector width direction and is used to accommodate by press-fitting the mountable portion 44, the front end section of the upper arm portion 41, and the strut portion 45, to be described below, of the locking member 40, and an upper groove portion 19B that accommodates the rear end section of the upper arm portion 41 of the locking member 40. The front groove portion 19A is formed so as to extend in the forward-backward direction throughout the full extent of the housing 10 in the up-down direction. As shown in FIG. 3 (C), a mounting portion 13A, which constitutes the front end portion of the bottom wall 13, enters from the rear and extends at the bottom of the front groove 19A. The mounting portion 13A is formed so as to couple the opposed interior groove surfaces (two surfaces facing each other in the connector width direction) of the front groove portion 19A. As shown in FIG. 3 (C), the upper groove portion 19B, which extends in the forward-backward direction to a location proximate to the rear end of the top wall 12, extends through the top wall 12 in the up-down direction throughout the full extent in the forward-backward direction.

The first terminals 20, which are fabricated by punching from metal plate members while keeping their major faces (rolled surface) flat, are accommodated within the first terminal accommodating portions 17 of the housing 10, as illustrated in FIG. 3 (A), as a result of which the major faces of all the first terminals 20 are arranged and retained in the housing 10 at right angles to the connector width direction (Y-axis direction).

The first terminals 20 are press-fittingly mounted to the housing 10 from the front. As illustrated in FIG. 3 (A), the first terminals 20 have a base portion 21 that is press-fittingly retained in the front groove portion 17A of the housing 10, a first contact arm portion 24 that extends toward the rear from the rear edge of the base portion 21 through the front groove portion 17A and the upper groove portion 17B, and a projecting arm portion 25 that extends toward the front from the front edge of the bottom portion of the base portion 21 and projects into the movable member accommodating space 16.

The first contact arm portion 24, which extends slopingly downward as one moves rearward, is resiliently displaceable in the up-down direction. A first contact portion 24A, which can be brought into contact with the first circuit CIA on the flat-type conductor C from above, is provided in a downwardly protruding configuration in the rear end portion of the first contact arm portion 24. The first contact portion 24A, which is located within the receiving space 11, faces the interior surface of the receiving space 11, in other words, the top face of the bottom wall 13 across a gap 81 in the up-down direction (Z-axis direction), which is the connector thickness direction. The rear end face of the first contact portion 24A, which slopes downward as one moves forward, forms a first guide face 24A-1 used for forwardly guiding the flat-type conductor C. The bottom portion of the first guide face 24A-1 constitutes the rear end face of the first contact portion 24A.

At the top and bottom edges of the base portion 21, the base portion 21, which has two press-fit protrusions 21A formed at the bottom edge, is press-fittingly retained by the upper interior wall surface and lower interior wall surface of the front groove portion 17A. The base portion 21 has a retained portion 22 that is formed and retained with dimensions encompassing the full extent of the front groove portion 17A in the up-down direction, and an extension portion 23 that extends toward the rear along the first contact arm portion 24 from the rear edge of the bottom portion of the retained portion 22.

The extension portion 23, which is made shorter than the first contact arm portion 24 in the forward-backward direction, is accommodated within the front groove portion 17A in its entirety and has a reflective portion 23A in its rear end portion. In the present embodiment, light emitted forwardly into the receiving space 11 during post-production inspection of the connector can be reflected back by the reflective portions 23A. The reflective portions 23A are formed as reflecting surfaces 23A-1, whose rear end faces (through-thickness faces) are flat surfaces perpendicular to the forward-backward direction.

In the present embodiment, the reflecting surface 23A-1 is formed having the same dimensions as the gap 81 in the connector width direction while having dimensions exceeding the gap 81 in the up-down direction. Specifically, in the up-down direction, the reflecting surface 23A-1 is positioned so as to include the protruding end (bottom end) of the first contact portion 24A because the top end of the said reflecting surface 23A-1 is located above said protruding end, and is also positioned so as to include the location of the top face of the bottom wall 13 (interior surface of the receiving space 11) because the bottom end of the said reflecting surface 23A-1 is located below the top face of said bottom wall 13. In other words, when viewed from the rear, the reflecting surface 23A-1 is positioned within a range that includes the entire gap 81.

Substantially the rear half of the projecting arm portion 25 forms a supported arm portion 25A that extends along the bottom wall 13 and is supported from below by the bottom wall 13. Substantially the front half of the projecting arm portion 25 extends forwardly and downwardly of the front end of the bottom wall 13 and forms a first connecting portion 25B that serves as an anchor portion solder-connected to the circuits (not shown) on the mounting face of the circuit board with its bottom edge portion. In addition, a protruding portion 25C, which protrudes from the top edge of the projecting arm portion 25, is formed at an intermediate location of the projecting arm portion 25 in the forward-backward direction. In the present embodiment, sections made up of the front edge portion of the retained portion 22, the supported arm portion 25A, and the protruding portion 25C are positioned so as to enclose the hereinafter-described first shaft body portions 54 of the movable member 50 from the rear, from below, and from the front, thereby forming first shaft restricting portions 20A that restrict the rearward, downward, and forward movement of the first shaft body portions 54.

The second terminals 30, which are fabricated by punching from metal plate members while keeping their major faces (rolled surface) flat, are accommodated within the second terminal accommodating portions 18 of the housing 10, as illustrated in FIG. 3 (B), as a result of which the major faces of all the second terminals 30 are arranged and retained in the housing 10 at right angles to the connector width direction (Y-axis direction).

The second terminals 30 are press-fittingly mounted to the housing 10 from the rear. As illustrated in FIG. 3 (B), the second terminals 30 have an upper arm portion 31 that extends in the forward-backward direction along the top wall 12, a lower arm portion 34 that is positioned downwardly of the upper arm portion 31 and extends in the forward-backward direction along the bottom wall 13, and a strut portion 37 that extends in the up-down direction and couples the intermediate portions of the upper arm portion 31 and the lower arm portion 34 in the forward-backward direction.

The upper arm portion 31 has a restricting arm portion 32 that extends toward the front from the top end of the strut portion 37, and a second contact arm portion 33 that extends toward the rear from the top end of the strut portion 37. The restricting arm portions 32, which have their front end portions projecting into the movable member accommodating space 16, form second shaft restricting portions 32A located above the hereinafter-described second shaft body portions 55 of the movable member 50. The second shaft restricting portions 32A, which are positioned at a slight gap from the second shaft body portions 55 in the up-down direction, restrict the upward movement of the second shaft body portions 55. In the present embodiment, the previously discussed first shaft restricting portions 20A of the first terminals 20 restrict the movement of the first shaft body portions 54 and the second shaft restricting portions of the second terminals 30 restrict the movement of the second shaft body portions 55, thereby restricting the movement of the first shaft body portions 54, the second shaft body portions 55 (which are referred to collectively hereinbelow as "shaft body portions 54, 55" whenever necessary), and, by extension, the movable member 50 in a plane perpendicular to the connector width direction, which, as a result, makes it possible to prevent the detachment of the movable member 50.

The second contact arm portion 33, as illustrated in FIG. 3 (B), extends slopingly downward as one moves rearward through the upper groove portion 18B, and is resiliently displaceable in the up-down direction. A second contact portion 33A, which can be brought into contact with the second circuit CIA of the flat-type conductor C from above, is provided in a downwardly protruding configuration in the rear end portion of the second contact arm portion 33. The second contact portion 33A is positioned rearwardly of the first contact portion 24A of the first contact arm portion 24 of the first terminals 20. The rear end face of the second terminals 30, which slopes downward as one moves forward, is formed as a second guide face 33A-1 used for forwardly guiding the flat-type conductor C. The bottom portion of the second guide face 33A-1 constitutes the rear end face of the second contact portion 33A.

The lower arm portion 34 has a retained arm portion 35 that extends toward the front from the bottom end of the strut portion 37, and a projecting arm portion 36 that extends toward the rear from the bottom end of the strut portion 37. As illustrated in FIG. 3 (B), the retained arm portion 35, which is made shorter than the restricting arm portion 32 of the upper arm portion 31, is press-fitted from the rear into the press-fit groove portion 18A-2 of the second terminal accommodating portion 18 of the housing 10. An upwardly protruding press-fit protrusion 35A is formed in the front end portion of the retained arm portion 35, and the second terminals 30 are retained within the second terminal accommodating portions 18 due to the fact that said press-fit protrusions 35A bite into the bottom face of the second terminal retaining portions 18A-1.

Substantially the front half of the projecting arm portion 36 forms a rectilinear portion 36A that extends in a rectilinear manner in the forward-backward direction along the top face of the bottom wall 13. Substantially the rear half of the projecting arm portion 36 has a reinforcing portion 36B that is located rearwardly of the rear end of the bottom wall 13 and extends toward the rear and downward from the rectilinear portion 36A, and a second connecting portion 36C that extends rearwardly from the reinforcing portion 36B. The second connecting portion 36C is solder-connected to the circuits (not shown) on the mounting face of the circuit board with its bottom edge potion.

As illustrated in FIG. 3 (B), a recess portion 36B-1 is formed in the top edge of the reinforcing portion 36B, within a range that includes the second contact portion 33A of the second contact arm portion 33 in the forward-backward direction. In the present embodiment, the gap between the second contact portion 33A and the reinforcing portion 36B in the up-down direction is increased by forming the recess portion 36B-1 in the reinforcing portion 36B, and, for this reason, in a punching die (not shown) used to form the second terminals 30 by punching from metal plate members, the section of the die used to form the above-mentioned gap can be made sufficiently large and adequate strength can be ensured in said section of the die.

The reinforcing portion 36B is made larger than the rectilinear portion 36A in the up-down direction, thereby avoiding a decrease in the strength of the reinforcing portion 36B itself due to the presence of the recess portion 36B-1. In addition, a front protrusion 36B-2 and a rear protrusion 36B-3, which protrude upwardly toward the receiving space 11 at the respective locations of the front and rear ends of the recess portion 36B-1, are formed at the top edge of the reinforcing portion 36B. The front protrusion 36B-2 is located forwardly of the second contact portion 33A, and the rear protrusion 36B-3 is located rearwardly of the second contact portion 33A. Therefore, once the flat-type conductor C has been inserted into the receiving space 11 and the second contact portion 33A has been brought into contact with the flat-type conductor C under contact pressure from above, the front protrusion 36B-2 and the rear protrusion 36B-3 support the flat-type conductor C from below. As a result, once pressure has been applied in the up-down direction at three points, i.e., the second contact portion 33A, the front protrusion 36B-2, and the rear protrusion 36B-3, the flat-type conductor C becomes securely clamped in the up-down direction, and inadvertent decoupling of the flat-type conductor C is prevented.

The bottom edge of the reinforcing portion 36B, which is positioned slightly above the bottom edge of the second connecting portion 36C, is adapted to avoid abutment against the mounting face of the circuit board when the connector 1 is disposed on said mounting face. Therefore, the second connecting portion 36C can be reliably connected to the circuits of the circuit board because a state in which the bottom edge of the reinforcing portion 36B would be located below the bottom edge of the second connecting portion 36C is unlikely to occur even if the bottom edge of the reinforcing portion 36B is located slightly downwardly of the normal design position because of fabrication errors.

The locking members 40, which are fabricated by punching from metal plate members while keeping their major faces (rolled surface) flat, are accommodated within the locking member accommodating portions 19 of the housing 10, as illustrated in FIG. 3 (C), as a result of which the locking members 40 are retained in the housing 10 with their major faces at right angles to the connector width direction (Y-axis direction).

The locking members 40 are press-fittingly mounted to the housing 10 from the front. As illustrated in FIG. 3 (C), the locking members 40 have an upper arm portion 41 that extends in the forward-backward direction along the top wall 12 upwardly of the receiving space 11, a mountable portion 44 that is mounted to the housing 10 downwardly of the upper arm portion 41, a strut portion 45 that extends upwardly from the mountable portion 44 and is coupled to the upper arm portion 41, and a projecting arm portion 46 that extends toward the front from the mountable portion 44.

The upper arm portion 41 has a pressure-receiving arm portion 42 that extends toward the front from the top end of the strut portion 45 and a locking arm portion 43 that extends toward the rear from the top end of the strut portion 45. As illustrated in FIG. 3 (C), the pressure-receiving arm portion 42 has a curved shape extending in a crank-like configuration when viewed in the connector width direction, with its front end portion positioned downwardly of other parts to form a pressure-receiving portion 42A. The pressure-receiving portions 42A, which are positioned with their top edges in contact with the pressure-applying portions 56A of the hereinafter-described cam portions 56 provided in the movable member 50, are adapted to be downwardly displaced under pressure applied from above by said pressure-applying portions 56A when the movable member 50 is brought to the open position (see FIG. 5 (C)). In addition, in the present embodiment, the pressure-receiving portions 42A are located within the bounds of the shaft body portions 54 and 55 of the movable member 50 in the forward-backward and up-down directions.

The locking arm portion 43, which extends slopingly downward as one moves rearward through the upper groove portion 19B, is resiliently displaceable in the up-down direction. An engaging portion 43A is provided in a downwardly protruding configuration in the rear end portions of the locking arm portions 43. The engaging portions 43A are positioned so as to permit entry into the notched portions C2 of the flat-type conductor C from above and engagement with engageable portions C3A from the rear when the movable member 50 is in the closed position (see FIG. 4 (C)). The rear end face of the engaging portions 43A, which slopes downward as one moves forward, is formed as an inclined face 43A-1 used for forwardly guiding the flat-type conductor C.

The mountable portion 44, which has a rearwardly open recumbent U-shaped configuration, is accommodated within the front groove portion 19A located forwardly of the receiving space 11. The mountable portion 44 has an upper clamping portion 44A and a lower clamping portion 44B, which are spaced apart from each other in the up-down direction and extend in the forward-backward direction, and a coupling portion 44C that couples the front end portions of the upper clamping portion 44A and the lower clamping portion 44B. The upper clamping portion 44A is resiliently displaceable in the up-down direction and, as illustrated in FIG. 3 (C), the upper clamping portion 44A and lower clamping portion 44B clamp the mounting portion 13A of the housing 10 in the up-down direction.

The strut portion 45 extends upward from the upper clamping portion 44A at a location proximal of the rear end of the upper clamping portion 44A, and is coupled to the upper arm portion 41. The projecting arm portion 46, which is positioned at the same height in the up-down direction as the lower clamping portion 44B, extends forwardly from the front end of said lower clamping portion 44B and projects into the movable member accommodating space 16. The front end portion of the projecting arm portion 46, which is formed as an anchor portion 46A used for anchoring to the mounting face of the circuit board, is adapted to be anchored to the mounting face with the bottom edge portion of said anchor portion 46A using solder connections.

As illustrated in FIG. 1, the movable member 50 extends across the full width of the movable member accommodating space 16 in the connector width direction, with the entire movable member 50 accommodated within the movable member accommodating space 16 in the closed position. In FIG. 2, the movable member 50, which is in a closed-position orientation, is shown separated from the housing 10. As illustrated in FIG. 2, the movable member 50 has an actuating portion 51, end walls 52, partition walls 53, first shaft body portions 54, second shaft body portions 55, and cam portions 56.

As shown in FIG. 2, the actuating portion 51, which is formed on the front end side of the movable member 50 while extending in the connector width direction, is adapted to receive actuating input for moving (pivoting) the movable member 50 between the closed position and the open position. The end walls 52 are provided in a rearwardly extending configuration from the opposite ends of the actuating portion 51 in the connector width direction. Multiple partition walls 53, which extend from the actuating portion 51 toward the rear between the two end walls 52 in the connector width direction, are formed in a side-by-side arrangement at spaced intervals in the connector width direction.

As shown in FIG. 2, the first shaft body portions 54, which are provided in the same positions as the first terminals 20 in the connector width direction, couple the opposed faces (faces perpendicular to the connector width direction) of the rear end portions (end portions on the X2 side) of two mutually adjacent partition walls 53. As shown in FIG. 3 (A), the cross-sectional shape of the first shaft body portions 54 perpendicular to the connector width direction is a substantially square shape with rounded corners. In addition, as shown in FIG. 3 (A), the first shaft body portions 54 are positioned in front of the retained portions 22 of the first terminals 20, above the supported arm portions 25A, and behind the protruding portions 25C with a slight gap from, respectively, the retained portions 22, the supported arm portions 25A, and the protruding portions 25C.

The second shaft body portions 55 are provided in the same positions as the second terminals 30 in the connector width direction and, as shown in FIG. 2, couple the opposed faces (faces perpendicular to the connector width direction) of the rear end portions (end portions on the X2 side) of two mutually adjacent partition walls 53. As shown in FIG. 3 (B), the cross-sectional shape of the second shaft body portions 55 perpendicular to the connector width direction has a substantially rectangular configuration with rounded corners, whose longitudinal direction is the up-down direction. In addition, as shown in FIG. 3 (B), along with having their bottom faces supported by the bottom wall 13 of the housing 10, the second shaft body portions 55 are positioned below the second shaft restricting portions 32A of the second terminals 30 with a slight gap from said second shaft restricting portions 32A.

The cam portions 56 are provided in the same positions in the connector width direction as the locking members 40 and, as shown in FIG. 2, couple the opposed faces (faces perpendicular to the connector width direction) of the most outward partition walls 53 in the connector width direction and the end walls 52 adjacent to said partition walls 53. As shown in FIG. 3 (C), the cam portions 56 extend in the forward-backward direction, and, along with having their front end portions coupled to the bottom portion of the actuating portion 51, have a rear edge of a circular arcuate shape. The cam portions 56 are positioned upwardly of the pressure-receiving portions 42A of the pressure-receiving arm portions 42 of the locking members 40 and downwardly of the rear half of the pressure-receiving arm portions 42 (sections extending in the forward-backward direction). The rear end portions of the cam portions 56 are formed as pressure-applying portions 56A capable of applying pressure to the pressure-receiving portions 42A from above, and the bottom faces of the pressure-applying portions 56A are brought into contact with the pressure-receiving portions 42A. In the present embodiment, the pressure-applying portions 56A are located within the bounds of the first shaft body portions 54 and second shaft body portions 55 in the up-down and forward-backward directions.

The pivotal center O, through which the pivotal axis of the movable member 50 passes, is shown in each view of FIGS. 3 (A) to 3 (C). As shown in FIG. 3 (A), at the location of the first shaft body portions 54 in the connector width direction, the pivotal center O is positioned slightly forwardly of the substantially central portion of the first shaft body portions 54 when viewed in the connector width direction. As shown in FIG. 3 (B), at the location of the second shaft body portions 55 in the connector width direction, the pivotal center O is positioned slightly to the front in the top portion of the second shaft body portions 55 when viewed in the connector width direction. As shown in FIG. 3 (C), at the location of the cam portions 56 in the connector width direction, the pivotal center O is positioned at the point of contact between the pressure-applying portions 56A of the cam portions 56 and the pressure-receiving portions 42A.

In the present embodiment, positioning the pressure-receiving portions 42A formed in the front end portions of the pressure-receiving arm portions 42 of the locking members 40 downwardly of the other parts of the pressure-receiving arm portions 42 makes it possible to provide the cam portions 56 of the movable member 50 in a lower position in comparison with forming the entire pressure-receiving arm portion 42 in a rectilinear manner even though the cam portions 56 of the movable member 50 are located above the pressure-receiving portions 42A, and, as a result, makes it possible to achieve a reduction in the profile, i.e., miniaturization in the up-down direction, of the connector 1.

In addition, in the present embodiment, positioning the pressure-applying portions 56A of the cam portions 56 in the movable member 50 within the bounds of the shaft body portions 54 and 55 in the up-down direction achieves a reduction in the profile of the movable member 50 and, by extension, the connector 1 in comparison with positioning the pressure-applying portions 56A outside the range of the shaft body portions 54 and 55 in the up-down direction. Further, since the pressure-applying portions 56A of the cam portions 56 are located within the bounds of the shaft body portions 54 and 55 in the up-down direction, the pressure-applying portions 56A are located in the vicinity of the pivotal axis, in other words, pivotal center O of the movable member 50. Therefore, it becomes easy to apply pressure to the pressure-receiving portions 42A with the pressure-applying portions 56A from above without maximizing the size of the cam portions 56.

At such time, the closer the pressure-applying portions 56A are to the pivotal axis, the greater the force (pressure force) required to depress the pressure-receiving portions 42A with the pressure-applying portions 56A when moving the movable member 50 from the closed position to the open position during the unlocking operation. However, in the present embodiment, the locking members 40 are disposed only on opposite external sides of the terminal array range and the number of the provided locking members 40 is small. Furthermore, in the process of pivoting of the movable member, the first shaft restricting portions 20A of the first terminals 20 do not come into contact with the first shaft body portions 54 of the movable member 50 and no contact pressure is generated therebetween. In addition, in the process of pivoting of the movable member 50, the second shaft restricting portions 32A of the second terminals 30 are only temporarily lifted up by the corner portions 55A of the second shaft body portions 55, and the duration of the contact pressure therebetween is therefore short. As a result, the actuating force (unlocking actuating force) required to move the movable member 50 from the closed position to the open position is decreased, which makes it possible to easily perform the unlocking operation even if the above-mentioned pressure force increases during the unlocking operation.

Although in the present embodiment the movable member 50 is adapted to move between the closed position and the open position simply by pivoting about a pivotal axis extending in the connector width direction, the way of movement of the movable member 50 is not limited thereto, and it may, for example, be adapted to pivot in combination with sliding movement.

The connector 1 is assembled in accordance with the following procedure. First, the first terminals 20 and the locking members 40 are mounted to the housing 10 from the front. Specifically, the base portions 21 of the first terminals 20 are press-fitted into the front groove portions 17A of the housing 10 (see FIG. 3 (A)), and the mounting portions 13A of the housing 10 are clamped by the mountable portions 44 of the locking members 40 (see FIG. 3 (C)). The first terminals 20 and the locking members 40 may be mounted either one after the other, or at the same time.

Next, the movable member 50 is disposed in the movable member accommodating space 16 of the housing 10. Specifically, the first shaft body portions 54 are disposed in the spaces surrounded by the first shaft restricting portions 20A formed by the front end portions of the retained portions 22 of the first terminals 20, the supported arm portions 25A, and the protruding portions 25C (see FIG. 3 (A)), the second shaft body portions 55 are disposed on the top face of the front end portion of the bottom wall 13 (see FIG. 3 (B)), and the pressure-applying portions 56A of the cam portions 56 are disposed on the pressure-receiving portions 42A of the locking members 40 (see FIG. 3 (C)). Next, the second terminals 30 are mounted to the housing 10 from the rear. Specifically, the retained arm portions 35 of the second terminals 30 are press-fitted into the press-fit groove portions 18A-2 of the housing 10 from the rear (see FIG. 3 (B)). As a result, the second shaft restricting portions 32A of the second terminals 30 are positioned immediately above the second shaft body portions 55 of the movable member 50. Therefore, the movement of the shaft body portions 54, 55 in a plane perpendicular to the connector width direction is restricted by the first shaft restricting portions 20A of the first terminals 20 and the second shaft restricting portions 32A of the second terminals 30 and, as a result, detachment of the movable member 50 from the housing 10 is adequately prevented. The mounting of the first terminals 20, the second terminals 30, the locking members 40, and the movable member 50 to the housing 10 in this manner completes the assembly of the connector 1.

In the present embodiment, an inspection to confirm whether the vertical dimensions of the gap through which the flat-type conductor C enters at the location of the first contact portions 24A of the first terminals 20 are properly ensured or not is carried out upon completion of assembly of the connector 1. With respect to the first terminals 20, the term gap, as used herein, refers to the vertical dimensions of the space between the first contact portions 24A and the top face of the bottom wall 13 of the housing 10 facing the same, which is designated as 81 in FIG. 3 (A).

The inspection device (not shown) used for inspection, which is provided behind the connector 1, has an emitting portion (not shown) that emits light forwardly toward the receiving space 11 of the housing 10, an imaging portion (not shown) that captures images (inspection images) of the connector 1 as seen from the rear, and a measuring portion (not shown) that analyzes the captured inspection images and measures the vertical dimensions of the gap 81.

At the time of inspection, when light is emitted forwardly from the emitting portion toward the receiving space 11, the light that reaches the reflecting surfaces 23A-1 of the first terminals 20 is reflected back, i.e., toward the rear end opening 11A, by said reflecting surfaces 23A-1. In the present embodiment, the first guide faces 24A-1, which constitute the rear end faces of the first terminals 20, are inclined faces sloping downward as one moves forward, and the light that reaches the first guide faces 24A-1 is unlikely to be reflected toward the rear end opening 11A.

Therefore, in the inspection images captured by the imaging portion, the first contact portions 24A become darker, and the reflecting surfaces 23A-1 become lighter. In other words, clear inspection images with high contrast between the first contact portions 24A and the reflecting surfaces 23A-1 are obtained. As a result, the location of the protruding ends (bottom ends) of the first contact portions 24A in the inspection images can be easily determined, which makes it possible for the measuring portion to precisely measure the vertical dimensions of the gap 81.

In the present embodiment, positioning the reflecting surfaces 23A-1 within a range that includes the entire gap 81 as previously discussed makes it possible for light emitted forwardly toward the receiving space 11 to be adequately reflected back by the reflecting surface 23A-1. In addition, since the reflecting surfaces 23A-1 are formed as surfaces perpendicular to the forward-backward direction in the forward-backward direction, light can be reflected back by the reflecting surfaces 23A-1 in a more adequate manner.

In addition, in the present embodiment, the reflective portions 23A are formed in the rear end portions of the extension portions 23 extending toward the rear from the retained portions 22, which makes it possible to dispose the reflecting surfaces 23A-1 closer to the first contact portions 24A in the forward-backward direction. In other words, given the constraint that the reflecting surfaces 23A-1 are disposed forwardly of the first contact portions 24A, the reflecting surfaces 23A-1 can be disposed as rearwardly as possible, in other words, at locations close to the rear end opening 11A of the receiving space 11. Therefore, even though the rear end opening 11A of the receiving space 11 is small, light emitted forwardly toward the receiving space 11 is likely to reach the reflecting surfaces 23A-1 and a sufficient quantity of light can be reflected back by the reflecting surfaces 23A-1. As a result, it becomes easy to capture clear inspection images with high contrast between the first contact portions 24A and the reflecting surfaces 23A-1 and determine the location of the first contact portions 24A, which makes it possible to accurately measure the dimensions of the gap 81.

Although in the present embodiment the extension portions 23 provided with the reflective portions 23A are arm-shaped sections that extend toward the rear from the rear ends of the retained portions 22, the form of the extension portions is not limited thereto. For example, the extension portions may be arm-shaped sections of a substantially L-shaped configuration that extend downward from the bottom edge of the front end sections of the contact arm portions 24 and then extend further rearward. In such a case, the reflective portions are formed in the rear end portions of the rearwardly extending sections, and the reflecting surfaces are formed on the rear end faces of said rear end portions. In addition, the extension portions may be arm-shaped sections or protrusion-shaped sections that extend downward from the bottom edges of the front end sections of the contact arm portions 24. In such a case, the reflective portions are formed in the bottom end portions of the extension portions, and the reflecting surfaces are formed on the rear end faces of said bottom end portions.

In addition, although in the present embodiment the reflecting surfaces 23A-1 are located within a range that includes the entire gap 81, it is not essential for the reflecting surfaces 23A-1 to be located within a range that includes the entire gap 81 as long as sufficient reflected light can be obtained to determine the location of the first contact portions 24A. For example, the reflecting surfaces 23A-1 may be provided within a range that overlaps with a portion of the gap 81 while including the protruding ends of the contact portions. In addition, although in the present embodiment the reflecting surfaces 23A-1 are flat surfaces perpendicular to the forward-backward direction, it is not essential for the reflecting surfaces 23A-1 to be surfaces perpendicular to the forward-backward direction as long as sufficient reflected light can be obtained to determine the location of the first contact portions 24A, and these surfaces may be, for example, somewhat curved or somewhat inclined.

The operations of insertion and extraction of the flat-type conductor C into and from the connector 1 will be described below.

First, the first connecting portions 25B of the first terminals 20 and the second connecting portions 36C of the second terminals 30 of the connector 1 are solder-connected to the corresponding circuits of the circuit board (not shown) and the anchor portions 46A of the locking members 40 are solder-connected to the corresponding portions of the circuit board. The connector 1 is mounted to the circuit board using the solder connections of these first connecting portions 25B, second connecting portions 36C, and anchor portions 46A.

Next, as shown in FIG. 1, the flat-type conductor C is positioned so as to extend parallel to the mounting face of the circuit board (not shown) in the forward-backward direction (X-axis direction) behind the connector 1, in which the movable member 50 has been brought to the closed position. Next, the flat-type conductor C is inserted into the receiving space 11 of the connector 1 in the forward direction (X1 direction).

In the process of insertion of the flat-type conductor C into the receiving space 11, the front end of the flat-type conductor C, first, resiliently displaces the second contact arm portions 33 upward by abutting the second guide faces 33A-1 of the second contact portions 33A of the second terminals 30 and pushing the second contact portions 33A upward under the action of the upward component of the abutment force. As the flat-type conductor C is inserted further forward while being guided by the second guide faces 33A-1, the front end of said flat-type conductor C resiliently displaces the first contact arm portions 24 upward by abutting the first guide faces 24A-1 of the first contact portions 24A of the first terminals 20 and pushing said first contact portions 24A up. The flat-type conductor C is inserted further forward while being guided by the first guide faces 24A-1.

As illustrated in FIGS. 4 (A) and 4 (B), even upon complete insertion of the flat-type conductor C, the first contact arm portions 24 of the first terminals 20 and the second contact arm portions 33 of the second terminals 30 remain resiliently displaced. As a result, a state is maintained in which the first contact portions 24A and the second contact portions 33A have been brought into contact with, respectively, the first circuit C1A and the second circuit C1B (see FIG. 1) of the flat-type conductor C under contact pressure.

In addition, in the process of insertion of the flat-type conductor C into the receiving space 11, specifically, when the front end of the flat-type conductor C passes the location of the second contact portions 33A and before it reaches the location of the first contact portions 24A, the ear portions C3 located proximal of the opposite ends of the flat-type conductor C in the width direction abut the inclined faces 43A-1 of the engaging portions 43A formed in the locking arm portions 43 of the locking members 40. Then, as the flat-type conductor C is inserted further forward while being guided by the inclined faces 43A-1, the engaging portions 43A are lifted up under the action of the vertical component of the force of abutment against the inclined faces 43A-1.

In the present embodiment, the locking arm portions 43, strut portions 45, and upper clamping portions 44A of the locking members 40 are resiliently displaceable, and the spring length is the length of the range encompassing these sections. Therefore, when the ear portions C3 of the flat-type conductor C lift the engaging portions 43A, the locking arm portions 43, strut portions 45, and upper clamping portions 44A effect rocking motion about the coupling portions 44C of the mountable portions 44 as fulcra and are resiliently displaced upward (Z1 direction), and, as a result, further insertion of the flat-type conductor C is permitted.

When the flat-type conductor C is inserted further forward and the ear portions C3 pass the location of the engaging portions 43A, the locking arm portions 43 are displaced downward (Z2 direction) such that the amount of resilient displacement is reduced and they return to a free state, thus push-fitting into the notched portions C2 of the flat-type conductor C. As a result, the engageable portions C3A of the flat-type conductor C are positioned so as to permit engagement with the engaging portions 43A forwardly of said engaging portions 43A, and rearward extraction of the flat-type conductor C is prevented (see FIG. 4 (C)). It should be noted that it is not essential for the locking arm portions 43 to go back to a completely free state. For example, it is possible to use a configuration in which the engaging portions 43A are positioned so as to permit engagement with the engageable portions C3A by push-fitting into the notched portions C2 of the flat conductor C while a certain amount of residual resilient displacement remains in the locking arm portions 43.

The operation of insertion of the flat-type conductor C is complete when, as shown in FIGS. 4 (A) to 4 (C), the front end of the flat-type conductor C abuts the front wall 15 of the housing 10.

Figure 5A:
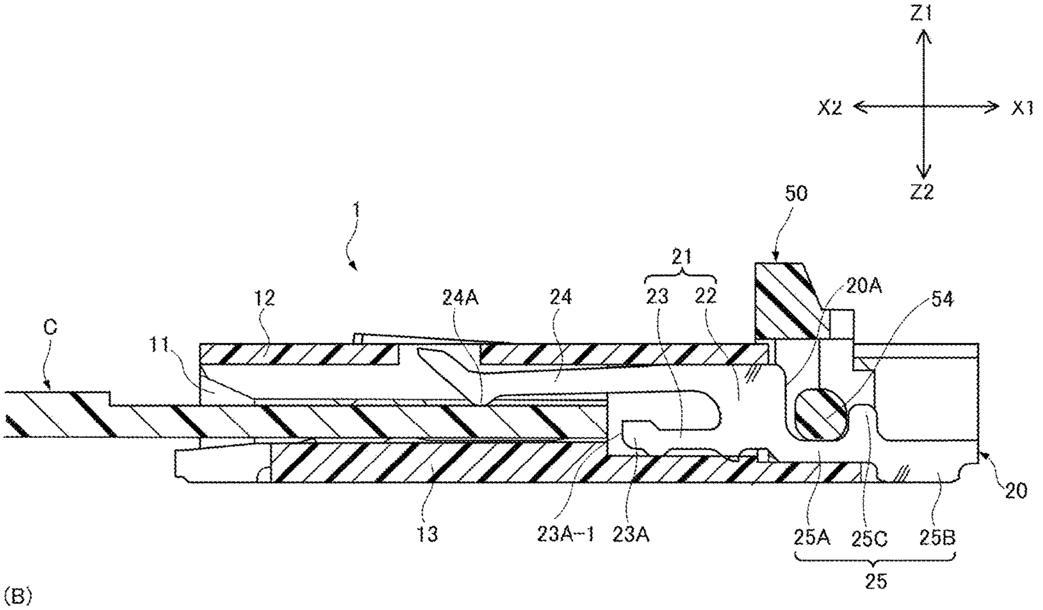
FIGS. 5 (A) to 5 (C) illustrate a longitudinal cross-sectional view of the electrical connector for flat-type conductors immediately prior to removal of the flat-type conductor, wherein FIG. 5 (A) illustrates a cross-section at the location of a first terminal, FIG. 5 (B) a cross-section at the location of a second terminal, and FIG. 5 (C) a cross-section at the location of a locking member.
Figure 5B:
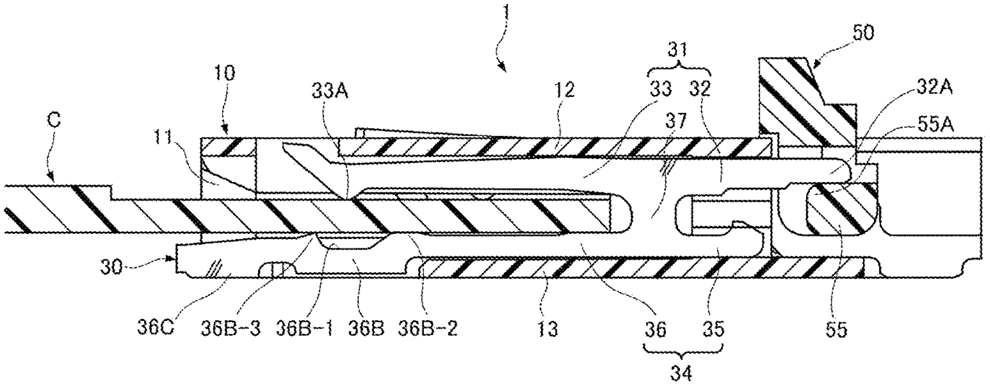
Figure 5C:
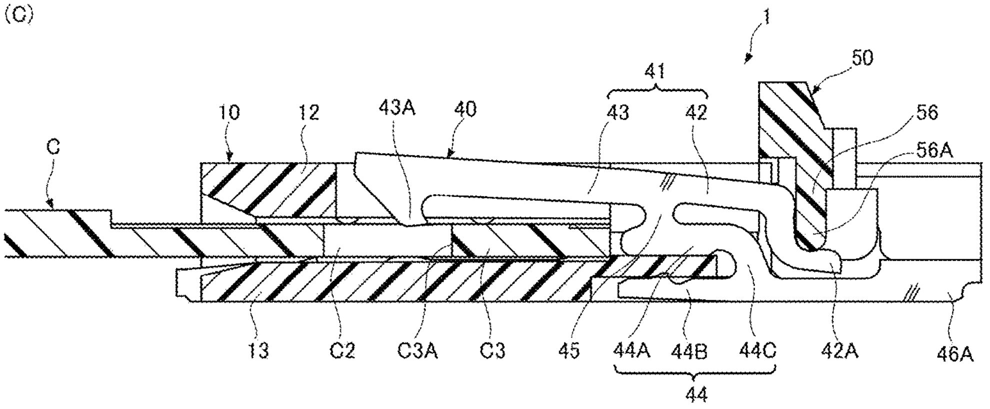

When the flat-type conductor C in the condition illustrated in FIGS. 4 (A) to 4 (C), that is, connected to the connector 1, is intentionally extracted from the connector 1, the movable member 50 in the closed position is pivoted, which brings it to the open position illustrated in FIGS. 5 (A) to 5 (C). Due to the fact that the pressure-applying portions 56A of the cam portions 56 of the movable member 50 push the pressure-receiving portions 42A of the locking members 40 down as the movable member 50 moves to the open position, the locking arm portions 43, strut portions 45, and upper clamping portions 44A are resiliently displaced upward as previously discussed in connection with the operation of insertion of the flat-type conductor C. As a result, the engaging portions 43A of the locking arm portions 43 of the locking members 40 are upwardly detached from the notched portions C2 of the flat-type conductor C. The state of detachment of the engaging portions 43A from the notched portions C2 is maintained even after bringing the movable member 50 to the open position, as a result of which the engaging portions 43A are disengaged from the engageable portions C3A of the flat-type conductor C and extraction of the flat-type conductor C is permitted. The flat-type conductor C is then easily extracted from the connector 1 by pulling said flat-type conductor C toward the rear (X2 direction), and the extraction operation is complete.

As the movable member 50 is pivoted from the closed position to the open position, the first shaft body portions 54 of the movable member 50 do not come into contact with the first shaft restricting portions 20A made up of the front end portions of the retained portions 22 of the first terminals 20, the supported arm portions 25A, and the protruding portions 25C. On the other hand, in the second shaft body portions 55 of the movable member 50, immediately after the movable member 50 starts pivoting toward the open position, the corner portions 55A of the second shaft body portions 55 abut the second shaft restricting portions 32A from below and bring said second shaft restricting portions 32A to a state of resilient displacement by slightly lifting them up. Then, as the movable member 50 pivots further and reaches the open position, as illustrated in FIG. 5 (B), the second shaft restricting portions 32A are brought out of the state of resilient displacement, supporting and contacting the corner portions 55A of the second shaft body portions 55 from above.

In addition, since in the present embodiment, as previously discussed, resilient displacement is made possible not only in the locking arm portions 43 and strut portions 45, but also in the upper clamping portions 44A of the mountable portions 44, a longer spring length is correspondingly ensured. In addition, since the upper clamping portions 44A, which form part of the mountable portions 44 used for mounting the locking members 40 to the housing 10, are used as resiliently displaceable sections, there is no need to provide new sections in the locking members 40 or make the locking arm portions 43 and strut portions 45 longer in order to increase the spring length, and no increase in the size of the connector 1 occurs.

Although in the present embodiment, the upper clamping portions 44A of the mountable portions 44 of the locking members 40 are resiliently displaced upward along with the locking arm portions 43 and the strut portions 45 in the process of insertion and extraction of the flat-type conductor C, the lower clamping portion 44B is not resiliently displaced upward. Therefore, since the upper clamping portion 44A and the lower clamping portion 44B in the mountable portion 44 are spaced apart because only the upper clamping portion 44A is displaced upward, the clamping force applied by the mountable portion 44 to the mounting portion 13A of the housing 10, i.e., the strength of attachment of the mountable portion 44, may be somewhat decreased.

However, the operations of insertion and extraction of the flat-type conductor C are performed after mounting the connector 1 to the mounting face of the circuit board, i.e., after anchoring the anchor portions 46A of the locking members 40 to the mounting face of the circuit board using solder connections. Therefore, even though the upper clamping portions 44A and the lower clamping portions 44B of the mountable portions 44 are spaced apart and the clamping force is somewhat decreased, the locking members 40 do not become detached from the housing 10 because the locking members 40 are already anchored to the circuit board at this point in time.

In addition, although in the present embodiment the lower clamping portion 44B is not resiliently displaced upward when the upper clamping portion 44A of the mountable portion 44 is resiliently displaced upward, as an alternative, both the upper clamping portion 44A and the lower clamping portion 44B may be resiliently displaced upward. By doing so, the condition in which the mounting portion 13A of the housing 10 is clamped by the upper clamping portion 44A and the lower clamping portion 44B is maintained even in the state of resilient displacement. As a result, the decrease in the strength of attachment of the mountable portion 44 to the housing 10 can be minimized.

Although in the present embodiment the locking members 40 are provided with mountable portions 44 having upper clamping portions 44A, lower clamping portions 44B, and coupling portions 44C, and the upper clamping portions 44A are resiliently displaceable along with the locking arm portions 43 and the strut portions 45, as long as the magnitude of the unlocking actuating force is kept to an acceptable level, the spring length of the terminals can be increased by adopting a configuration similar to that of the locking members 40 for at least one type of terminal from among the first terminals and second terminals.

If a configuration similar to that of the locking members 40 is applied to the terminals, said terminals are provided with upper arm portions, mountable portions, strut portions, and connecting portions (anchor portions). In addition, the upper arm portions are provided with a pressure-receiving arm portion that extends forwardly from the top end of the strut portion and has a pressure-receiving portion formed in the front end portion, and a contact arm portion that extends rearwardly from the top end of the strut portion and has a contact portion formed in the rear end portion. Furthermore, above the pressure-receiving portions of the pressure-receiving arm portions, the movable member is provided with cam portions similar to the cam portions 56 and the movable member 50 of the present embodiment.

If the terminals are configured in this manner, as the movable member moves to the open position when the flat-type conductor is extracted, the cam portions of the movable member depress the pressure-receiving portions, and the contact arm portions, strut portions, and upper clamping portions of the mountable portions are resiliently displaced upward. As a result, contact between the contact portions of the contact arm portions and the circuits of the flat-type conductor is broken.

Even though the spring length is increased with the terminals configured in this manner, no increase in the size of the connector occurs and, in addition, even though the strength of attachment of the mountable portion to the housing is somewhat reduced, the terminals do not become detached from the housing in the same manner as described above for the locking members 40.

Alternative Examples

In the previously discussed embodiment, the component facing the first contact portions 24A of the first terminals 20 in the up-down direction is the bottom wall 13 of the housing 10, which is a component separate from the first terminals 20. Therefore, once the first terminals 20 are attached to the housing 10, errors in the regular dimensions of the gap between the first contact portions 24A and the bottom wall 13 will be relatively more likely to occur due to the fact that the first contact portions 24A are positioned with an offset from the regular location in the up-down direction. Accordingly, in the previously discussed embodiment, the accuracy of measurement of the dimensions of the gap 81 was improved as a result of enabling capture of clear inspection images and facilitating the identification of the location of the first contact portions 24A by providing reflective portions 23A in the first terminals 20.

Meanwhile, in the case of the second terminals 30, dimensional errors are relatively less likely to occur in the gap formed between the second contact portions 33A and the projecting arm portions 36 because the second contact arm portions 33 provided with the second contact portions 33A and the projecting arm portions 36 that face the second contact portions 33A across a gap in the up-down direction are formed simultaneously in the same components, that is, in the second terminals 30, by punching a single sheet metal member. Therefore, compared to the first terminals 20, in the case of the second terminals 30, there is less need to provide reflective portions in order to obtain clear inspection images and, for this reason, no reflective portions are provided in the second terminals 30 in the previously discussed embodiment.

However, if clear inspection images could be obtained by providing reflective portions in the second terminals 30 as well, this would be desirable from the standpoint of being able to more accurately measure the vertical dimensions of the gap between the second contact portions 33A and the projecting arm portions 36.

Figure 6A:
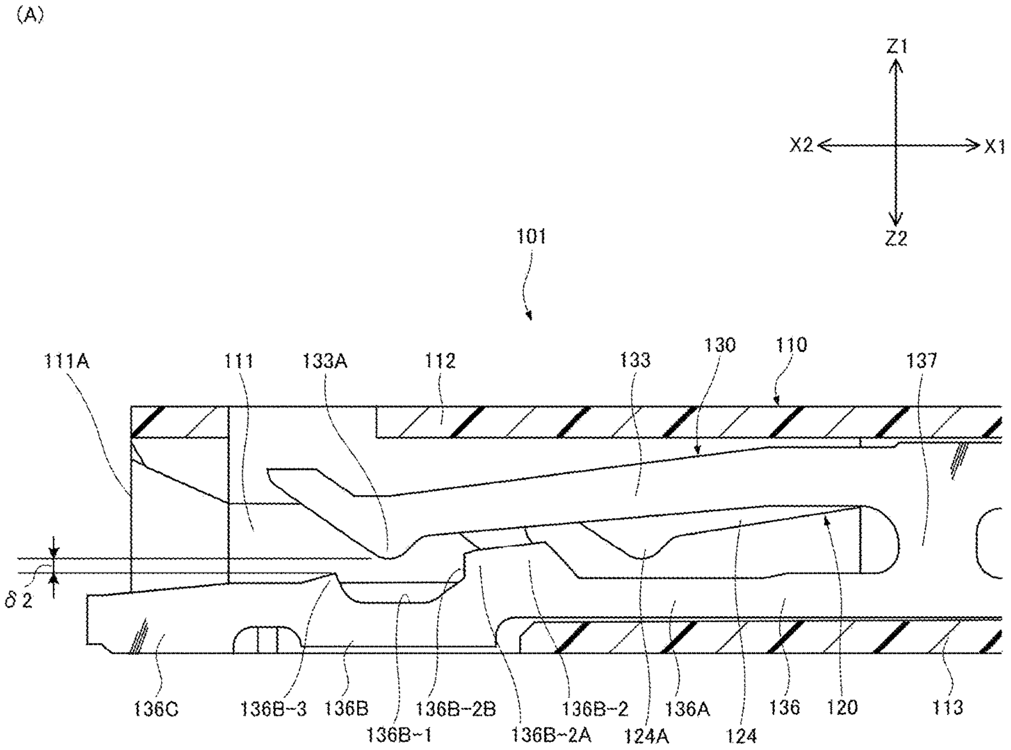
FIGS. 6 (A) to 6 (B) illustrate longitudinal cross-sectional views of the electrical connector for flat-type conductors according to alternative examples of the first embodiment taken at the location of the second terminals, where FIG. 6 (A) illustrates a first alternative example, and FIG. 6 (B) a second alternative example.
Figure 6B:
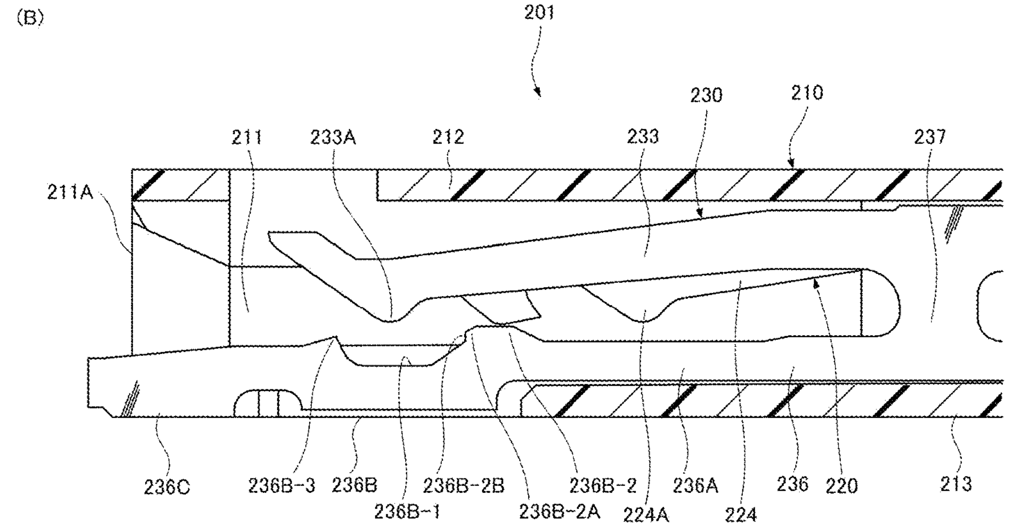

An alternative example, in which the second terminals are provided with reflective portions, is described hereinbelow. FIG. 6 (A) is cross-sectional view showing a partially enlarged longitudinal cross-section of the connector 101 taken at the location of the second terminals 130 in the first alternative example. In this alternative example, the reflective portions 136B-2A are provided in the front protrusions 136B-2 of the second terminals 130, and, in this regard, the configuration is different from the second terminals 30 of the previously discussed embodiment. Since the shape of the section that does not include the front protrusion 136B-2 in the second terminals 130 is the same as in the second terminals 30, the discussion herein will focus on the shape of the front protrusion 136B-2 and numerals obtained by adding "100" to the numerals of each part of the second terminals 30 will be assigned in the case of other sections and their descriptions will be omitted. In addition, due to the fact that in the case of the housing 110 and the first terminals 120 the configuration is identical to that of the housing 10 and the first terminals 20 of the previously discussed embodiment, numerals obtained by adding "100" to the numerals of each part of the housing 10 and the first terminals 20 will be assigned thereto and their descriptions will be omitted.

As shown in FIG. 6 (A), the second terminals 130 in this alternative example have a second contact arm portion 133, which has formed therein a second contact portion 133A as a protrusion that protrudes toward the receiving space 111, and a projecting arm portion 136, which has formed therein a front protrusion 136B-2 and a rear protrusion 136B-3 that protrudes toward the receiving space 111. In the projecting arm portion 136, the front protrusion 136B-2 is formed so as to be positioned higher than the front protrusion 36B-2 of the second terminals 30 in the previously discussed embodiment. The rear end portion of the front protrusion 136B-2 constitutes a reflective portion 136B-2A, and its rear end face (through-thickness face) constitutes a reflecting surface 136B-2B. The reflecting surface 136B-2B is formed as a flat surface perpendicular to the forward-backward direction, with the bottom end of said reflecting surface 136B-2B located downwardly of the protruding end (top end) of the rear protrusion 136B-3 and the top end of said reflecting surface 136B-2B located upwardly of the protruding end (bottom end) of the second contact portion 133A. Therefore, when viewed from the rear, the reflecting surface 136B-2B is located within a range that overlaps with the entire gap 82 between the bottom end of the second contact portion 133A and the top end of the rear protrusion 136B-3.

When the connector 101 is inspected, light emitted forwardly from the emitting portion (not shown) of the inspection device toward the receiving space 111 is reflected rearward by the reflecting surfaces 136B-2B. In this alternative example, the reflective portions 136B-2A are formed in the front protrusions 136B-2 of the projecting arm portions 136. Since the front protrusions 136B-2 are provided at the front end of the recess portions 136B-1 that face the second contact portions 133A of the second contact arm portions 133, the reflective portions 136B-2A formed in these front protrusions 136B-2 are located in front of the second contact portions 133A, in close proximity to the second contact portions 133A. In other words, given the constraint that the reflecting surfaces 136B-2B are disposed forwardly of the second contact portions 133A, the reflecting surfaces 136B-2B can be disposed as rearwardly as possible, that is, at locations proximal to the rear end opening 111A of the receiving space 111. Therefore, light emitted forwardly toward the receiving space 111 is likely to reach the reflecting surfaces 136B-2B and a sufficient quantity of light can be reflected rearward by the reflecting surfaces 136B-2B. As a result, it becomes easy to identify the location of the second contact portions 133A by capturing clear inspection images.

In addition, in this alternative example, providing the reflecting surfaces 136B-2B within a range that includes not only the bottom ends of the second contact portions 133A, but also the top ends of the rear protrusions 136B-3 in the up-down direction, makes it easy to identify the location of the rear protrusions 136B-3 and, as a result, allows for the dimensions of the gap 82 to be measured more accurately. It should be noted that providing the rear protrusions 136B-3 is not essential in this alternative example as long as sufficient contact pressure is obtained between the first terminals 120 and second terminals 130 and the flat-type conductor.

Since the embodiment discussed previously with reference to FIGS. 1 through 5 measures the dimensions of the gap 81 between the contact portions 24A of the first terminals 20 and the bottom wall 13 of the housing 10 (see FIG. 3 (A)), it is possible to determine to a sufficient degree of accuracy whether the gap for inserting the flat-type conductor C at the location of the first terminals 20 is formed to the desired dimensions or not. However, in the previously discussed embodiment, as shown in FIG. 3 (A), the rear protrusions 36B-3 of the second terminals 30 adjacent to the first terminals 20 are located so as to protrude slightly beyond the top face of the housing 13. Therefore, strictly speaking, the gap for inserting the flat-type conductor C at the location of the first terminals 20 is a gap formed between the first contact portions 24A of the first terminals 20 and the rear protrusions 36B-3 of the second terminals 30 when viewed in the connector width direction. Therefore, if the dimensions of this gap are measured, it is possible to more accurately determine whether or not a proper gap has been provided for inserting the flat-type conductor C at the location of the first terminals 20.

As described above, in this alternative example, providing reflecting surfaces (not shown) makes it possible to easily identify the location of the first contact portions 124A in the first terminals 120, and providing the reflecting surfaces 136B-2B makes it possible to easily identify the location of the rear protrusions 136B-3 in the second terminals 130. Therefore, measuring the gap between the first contact portions 124A and the rear protrusions 136B-3 in the inspection images makes it possible to more accurately determine whether or not a proper gap has been ensured for inserting the flat-type conductor at the location of the first terminals 120.

As discussed previously, in this alternative example, the front protrusions 136B-2, which have the reflecting surfaces 136B-2B, are located so as to protrude into the receiving space 111 to a height extending upward of the bottom ends of the second contact portions 133A. However, the insertion of the flat-type conductor into the interior of the receiving space 111 is made possible by the fact that the flat-type conductor (not shown) inserted into the receiving space 111 resiliently displaces the second contact portions 133A upward and, in addition, by the fact that the flat-type conductor itself undergoes flexural deformation in the thickness direction (up-down direction) thereof.

In the first alternative example illustrated in FIG. 6 (A), the reflecting surfaces 136B-2B in the second terminals 130 are formed so as to extend above the bottom ends of the second contact portions 133A, and the location of the bottom ends of the second contact portions 133A can be easily identified in the captured inspection images. However, due to the fact that in the case of the second terminals 130 the second contact portions 133A and the rear protrusions 136B-3 are formed in the same components by punching a single sheet metal member, errors are relatively less likely to occur in the dimensions of the gap formed between the second contact portions 133A and the rear protrusions 136B-3. Therefore, as long as the dimensions of this gap can be ensured with adequate accuracy at the time of manufacture of the second terminals, it is not essential to determine the dimensions of this gap from inspection images after manufacturing the connector, that is, to form the reflecting surfaces in the second terminals so as to extend above the bottom ends of the second contact portions.

FIG. 6 (B) is a cross-sectional view showing a partially enlarged longitudinal cross-section of the connector 201 at the location of the second terminals 230 in the second alternative example. In the alternative example illustrated in FIG. 6 (B), the configuration is different from the second terminals 130 of the alternative example illustrated in FIG. 6 (A) in that the reflecting surfaces formed in the front protrusions in the second terminals 230 are located downwardly of the protruding ends of the second contact portions of the second contact arm portions.

The description hereinbelow will focus on the second terminals 230 of the alternative example of FIG. 6 (B) with emphasis on their differences from the second terminals 130 of the alternative example of FIG. 6 (A). Sections in common with the second terminals 130 will be assigned numerals obtained by adding "100" to the numerals of the corresponding sections of the second terminals 130 and their descriptions will be omitted. In addition, since the housing 210 and the first terminals 220 have the same configuration as the housing 110 and the first terminals 120 of the alternative example of FIG. 6 (A), they will be assigned numerals obtained by adding "100" to the numerals of each part in the housing 110 and the first terminals 120 and their descriptions will be omitted.

As shown in FIG. 6 (B), the second terminals 230 in the present alternative example have a second contact arm portion 233 having formed therein a second contact portion 233A as a protrusion that protrudes toward the receiving space 211, and a projecting arm portion 236 having formed therein a front protrusion 236B-2 and a rear protrusion 236B-3 that protrude toward the receiving space 211. The front protrusion 236B-2 of the projecting arm portion 236 is formed so as to be positioned higher than the front protrusion 36B-2 of the second terminals 30 in the previously discussed embodiment, and lower than the front protrusion 136B-2 of the second terminals 130 in the alternative example of FIG. 6 (A). The rear end portion of the front protrusion 236B-2 constitutes a reflective portion 236B-2A, and its rear end face (through-thickness face) constitutes a reflecting surface 236B-2B. The reflecting surface 236B-2B is formed as a flat surface perpendicular to the forward-backward direction, with the bottom end of the reflecting surface 236B-2B located downwardly of the protruding end (top end) of the rear protrusion 236B-3. Meanwhile, the top end of the reflecting surface 236B-2B is located upwardly of the protruding end (top end) of the rear protrusion 236B-3 and downwardly of the protruding end (bottom end) of the second contact portion 233A. Therefore, when viewed from the rear, the reflecting surface 236B-2B is located within a range that includes the top end of the rear protrusion 236B-3, but does not include the bottom end of the second contact portion 233A.

When the connector 101 is inspected, light emitted forwardly from the emitting portion (not shown) of the inspection device toward the receiving space 211 is reflected rearward by the reflecting surfaces 236B-2B. In this alternative example, the reflective portions 236B-2A are formed in the front protrusions 236B-2 of the projecting arm portions 236. Therefore, due to the fact that in this alternative example, similar to the first alternative example described above with reference to FIG. 6 (A), the location of the rear protrusions 236B-3 can be identified in the inspection images, the gap between the rear protrusions 236B-3 and the first contact portions 224A of the first terminals 220 can be accurately measured.

In this alternative example, the front protrusions 236B-2, which have reflecting surfaces 236B-2B, are located so as to protrude into the receiving space 211 to a height extending upward of the top ends of the rear protrusions 236B-3. However, the insertion of the flat-type conductor into the interior of the receiving space 211 is made possible by the fact that the flat-type conductor (not shown) inserted into the receiving space 211 resiliently displaces the second contact portions 233A upward and, in addition, by the fact that the flat-type conductor itself undergoes flexural deformation in the thickness direction (up-down direction) thereof. In addition, since in this alternative example the front protrusions 236B-2 are formed as to be positioned lower than the front protrusions 136B-2 in the first alternative example (see FIG. 6 (A)), the flat-type conductor is less likely to interfere with the front protrusions 236B-2 and the insertion of the flat-type conductor becomes easier in comparison with the first alternative example.

Although in the previously discussed first and second alternative examples the rear protrusions 136B-3 and 236B-3 did not have the functionality of contact portions placed in electrical communication with the circuitry of the flat-type conductor, the functionality of contact portions may be imparted to the rear protrusions 136B-3, 236B-3, either instead of the second contact portions 133A, 233A or in addition to the second contact portions 133A, 233A. In such a case, circuits intended for contact with the rear protrusions 136B-3, 236B-3 are formed in an exposed condition on the bottom face of the flat-type conductor.

Second Embodiment

Although in the first embodiment the inspection intended to measure the dimensions of the gap 81 formed at the location of the first contact portions 24A of the first terminals 20 was carried out by causing light emitted forwardly toward the receiving space 11 to be reflected rearward by the reflecting surfaces 23A-1 of the reflective portions 23A and acquiring inspection images captured from the rear, the way the inspection is conducted is not limited thereto. The second embodiment, in which light is emitted from below, is different in this regard from the first embodiment, in which light is emitted from the rear. Specifically, the second embodiment is adapted to emitting light into the front space located forwardly of the receiving space from below, causing this light to be reflected rearward by the reflecting surfaces of the reflective portions located within the front space, and acquiring inspection images by capturing images of the connector from the rear.

Figure 7A:
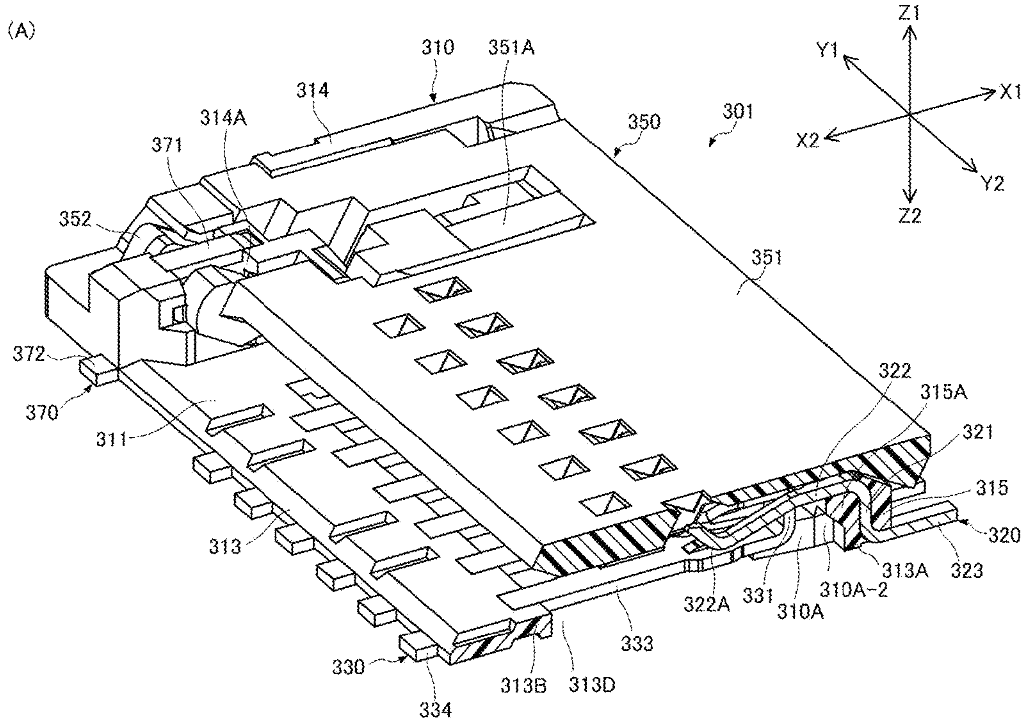
FIGS. 7 (A) and 7 (B) illustrate a perspective cross-sectional view illustrating a longitudinal cross-section of the electrical connector for flat-type conductors according to the second embodiment taken at the location of the first terminals, wherein FIG. 7 (A) is an angled view from above, and FIG. 7 (B) is an angled view from below.
Figure 7B:
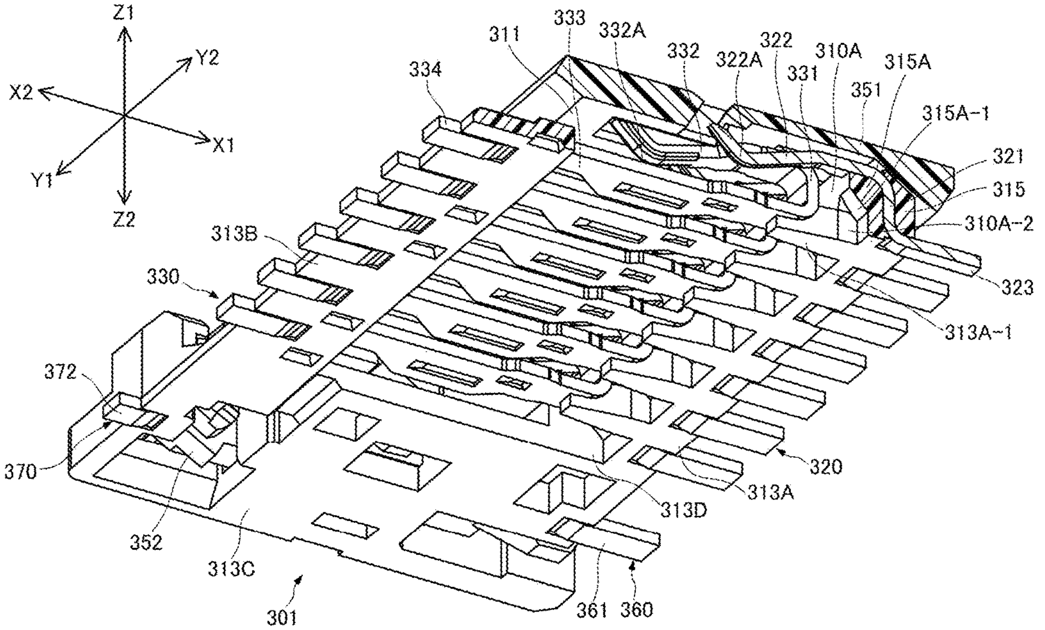
Figure 8:
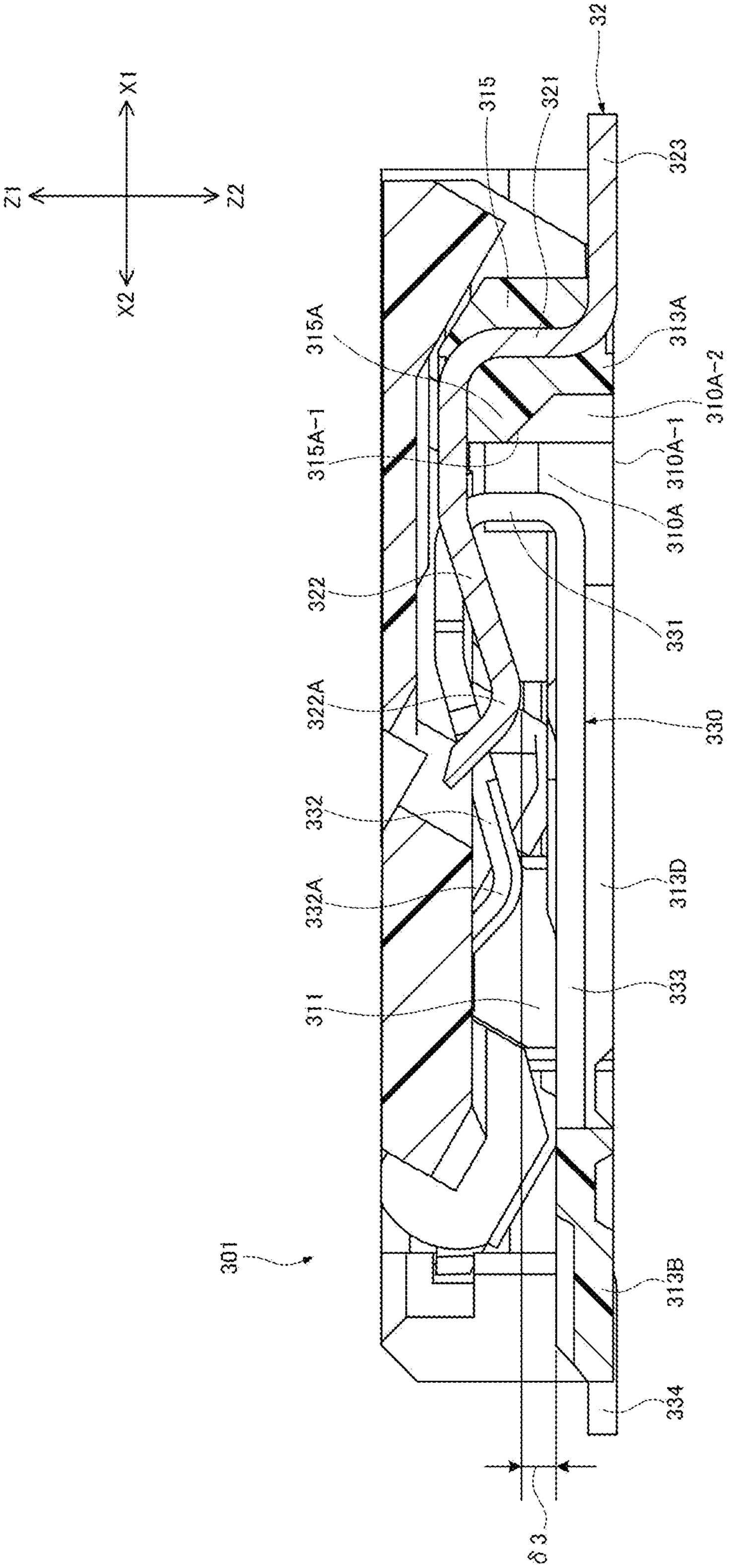
FIG. 8 illustrates a cross-sectional view of the electrical connector for flat-type conductors illustrating the longitudinal cross-section shown in FIGS. 7 (A) and 7 (B) as viewed in the connector width direction.

FIG. 7 (A), which is a perspective cross-sectional view of the connector 301 according to the present embodiment, illustrates the connector 301 in a longitudinal cross-section taken at the location of the first terminals 320 in the connector width direction, as seen at an angle from above. FIG. 7 (B) is a perspective cross-sectional view of the connector 301 illustrated in FIG. 7 (A), as seen at an angle from below. FIG. 8 is a cross-sectional view of the connector 301 illustrating the longitudinal cross-section shown in FIGS. 7 (A) and 7 (B) as viewed in the connector width direction.

The connector 301 according to the present embodiment, which comprises a housing 310 made of an electrically insulating material, multiple first terminals 320 and second terminals 330 made of metal, which are arranged such that the terminal array direction is the connector width direction and are retained by molding integrally with the housing 310, a movable member 350 made of an electrically insulating material, which is pivotable with respect to the housing 310 between a closed position and an open position, and front fittings 360 and rear fittings 370 disposed on opposite external sides of the terminal array range in the connector width direction, is adapted to have a flat-type conductor (not shown) connected thereto by insertion from the rear. Below, when there is no need to distinguish between the first terminals 320 and the second terminals 330, the two types of terminals will be referred collectively as “terminals 320, 330”.

The flat-type conductor connected by insertion into connector 301 has the same configuration as the flat-type conductor C connected by insertion into connector 1 in the first embodiment. In other words, a first circuit and a second circuit are exposed on the top face of the front end section of the flat-type conductor and, in addition, notched portions are formed in the opposite side edges of the flat-type conductor in the width direction and engageable portions are formed at the rear end edges of the ear portions located forwardly thereof.

In the present embodiment, the movable member 350, which is adapted to be pivotable about a pivotal axis extending in the connector width direction on the rear end side of the connector 301, engages the engageable portions (not shown) of the flat-type conductor from the rear in the closed position with the engaging portions (not shown) provided in said movable member 350, thereby preventing rearward decoupling of the flat-type conductor.

The housing 310 has a bottom wall 313 that extends parallel to the mounting face (not shown) of the circuit board; two side walls 314 which, in addition to upwardly rising at the locations of the opposite ends of the bottom wall 313 in the connector width direction, extend in the forward-backward direction; and a front wall 315 which, while rising at the location of the front end of the bottom wall 313, extends in the connector width direction and couples the two side walls 314.

The space enclosed by the front wall 315 and the two side walls 314 above the bottom wall 313 has formed therein a receiving space 311 for receiving a flat-type conductor from the rear, and the top portion of a front space 310A located forwardly of said receiving space 311.

As shown in FIG. 7 (B), the bottom wall 313 which, when viewed from below, is of a square frame configuration whose longitudinal direction is the connector width direction (Y-axis direction), has a front frame portion 313A and a rear frame portion 313B, which are parallel to each other and extend in the connector width direction, and two lateral frame portions 313C, which are located symmetrically in the connector width direction and extend in the forward-backward direction while coupling the end portions of the front frame portion 313A and the rear frame portion 313B.

As shown in FIG. 7 (B), the front frame portion 313A, which has retaining protrusions 313A-1 that protrude toward the rear at the location of the second terminals 330 in the connector width direction, is adapted to retain part of the second terminals 330 using the retaining protrusions 313A-1.

In addition, a space enclosed by the front frame portion 313A, rear frame portion 313B, and lateral frame portions 313C is formed in the bottom wall 313 as a bottom aperture portion 313D that extends in the up-down direction. Within the bottom aperture portion 313D, a space located forwardly of the receiving space 311 in the forward-backward direction constitutes the bottom portion of the previously discussed front space 310A. In other words, as shown in FIG. 8, the front space 310A, which has a downwardly open opening portion 310A-1, communicates with the exterior through said opening portion 310A-1. In addition, at the location of the first terminals 320 in the connector width direction, the front space 310A is open toward the rear and is in communication with the receiving space 311. As shown in FIG. 8, within the front space 310A, the space at the front end thereof is formed as a cutout space 310A-2 that extends in the up-down direction by making notches in the front frame portion 313A and the front wall 315.

As shown in FIG. 7 (A), upwardly open recessed shaft accommodating portions 314A are formed in the side walls 314 at locations proximal of the rear end. Part of the hereinafter-described shaft body portion 352 of the movable member 350 is rotatably accommodated within the shaft accommodating portions 314A.

The front wall 315 has a reflective portion 315A in the rear end portion located above the cutout space 310A-2, that is, located so as to overlap with the opening portion 310A-1 when viewed from below. The bottom face of the reflective portion 315A, i.e., the surface forming the upper interior wall surface of the cutout space 310A-2, is a flat inclined face that slopes downward as one moves forward, with said inclined face formed as a reflecting surface 315A-1 capable of rearwardly reflecting light emitted into the opening portion 310A-1 from below.

The reflecting surface 315A-1 is formed such that it has a region of overlap with the gap 83 (see FIG. 8) formed in the up-down direction between the hereinafter-described first contact portions 322A of the first terminals 320 and the rear frame portion 313B of the housing 310 when viewed from the rear. Specifically, as shown in FIG. 8, the top end of the reflecting surface 315A-1 is located upwardly of the protruding ends (bottom ends) of the first contact portions 322A, and the bottom end of the reflecting surface 315A-1 is located at the same height as the top face of the rear frame portion 313B. Although the reflecting surface 315A-1 can be formed in a variety of shapes as long as it can rearwardly reflect light from below, in the present embodiment, it is formed as a flat surface that slopes at a 45-degree angle in the forward-backward direction and the up-down direction.

In the present embodiment, the terminals 320, 330 are made using a process wherein strips of rolled sheet metal whose dimension in the connector width direction (Y-axis direction) is the terminal width direction are bent in the through-thickness direction. The first terminals 320 and second terminals 330 are differently shaped and are arranged in an alternating manner in the connector width direction.

As shown in FIG. 7 (B) and FIG. 8, the first terminals 320, which have a first base portion 321 that extends in the up-down direction at a location forward of the receiving space 311, a first contact arm portion 322 that extends from the top end of the first base portion 321 toward the rear, and a first connecting portion 323 that extends toward the front from the bottom end of the first base portion 321, have a generally crank-shaped configuration.

The first base portion 321, which extends through the front frame portion 313A and the front wall 315 in the up-down direction, is retained in an embedded state within the front frame portion 313A and the front wall 315 by being molded integrally therewith. The first contact arm portion 322 extends straight from the top end of the first base portion 321 toward the rear and then slopes slightly downward as one moves rearward. The first contact arm portion 322 has a first contact portion 322A formed by bending such that it protrudes downwardly, i.e., toward the receiving space 311, in its rear end portion. The first contact portion 322A, which is located within the receiving space 311, is adapted to be brought into contact with the corresponding circuits of the flat-type conductor as a result of upwardly directed resilient displacement of the first contact arm portion 322 when the flat-type conductor is inserted into the receiving space 311. The first connecting portion 323, which projects forwardly from the front frame portion 113A of the housing 110, is adapted to have its bottom face solder-connected to the circuits of the circuit board (not shown).

As shown in FIG. 7 (B) and FIG. 8, the second terminals 330 have a second base portion 331 that extends in the up-down direction at a location forward of the receiving space 311, a second contact arm portion 332 that extends from the top end of the second base portion 331 toward the rear, a retained arm portion 333 that extends from the bottom end of the second base portion 331 toward the rear, and a second connecting portion 334 that extends rearward from the rear end of the retained arm portion 333.

As shown in FIG. 8, the second base portion 331, which is located forwardly of the receiving space 311 and rearwardly of the first base portion 321 of the first terminal 320, separates the receiving space 311 from the front space 310A in the forward-backward direction. The second contact arm portion 332 extends straight from the top end of the second base portion 331 toward the rear and then slopes slightly downward as one moves rearward. The second contact arm portion 332 has a second contact portion 332A formed by bending such that it protrudes downwardly, i.e., toward the receiving space 311, in its rear end portion. The second contact portion 322A, which is located rearwardly of the first contact portion 322A of the first terminal 320 within the receiving space 311, is adapted to be brought into contact with the corresponding circuits of the flat-type conductor as a result of upwardly directed resilient displacement of the second contact arm portion 332 when the flat-type conductor is inserted into the receiving space 311.

The retained arm portion 333, which extends over a range that extends from the front frame portion 313A of the bottom wall 313 to the rear frame portion 313B in the forward-backward direction, has its front end portion retained in place by the front frame portion 313A and its rear end portion retained in place by the rear frame portion 313B as a result of being molded integrally therewith. The rear end portion of the retained arm portion 333 is bent downwardly within the rear frame portion 313B, and the second connecting portion 334 extends toward the rear from its bottom end, i.e., the rear end of the retained arm portion 333. The second connecting portion 334, which projects toward the rear from the rear frame portion 313B, has its bottom face adapted to be solder-connected to the circuits of the circuit board (not shown).

As can be seen in FIGS. 7 (A) and 7 (B), which illustrates the movable member 350 in a closed position, said movable member 350 has a generally plate-shaped main body portion 351 that extends in the forward-backward direction (X-axis direction) and in the connector width direction (Y-axis direction), and a shaft body portion 352 formed on the rear end side (side X2) of the main body portion 351 when the movable member 350 is in the closed position.

The main body portion 351 extends over a range that includes the terminal array range in the connector width direction and covers the terminals 320, 330 from above in the closed position. As shown in FIG. 7 (A), the main body portion 351 has locking arm portions 351A that extend toward the rear in a cantilever configuration at locations on opposite external sides of the terminal array range.

The locking arm portions 351A, which are adapted to be resiliently displaceable in the up-down direction when the movable member 350 is in the closed position, have downwardly protruding engaging portions (not shown) formed in the rear end portions thereof. Said engaging portions, which are push-fitted into the receiving space 311 of the housing 310 from above when the movable member 350 is in the closed position, are positioned so as to permit engagement with the engageable portions of the flat-type conductor inserted into the receiving space 311 from the rear and are adapted to prevent inadvertent decoupling of the flat-type conductor.

As can be seen in FIG. 7 (A), the shaft body portion 352 is provided in the rear end portion of the movable member 350 in the closed position at locations proximal of the opposite ends of the movable member 350 in the connector width direction, that is, at locations outward of the locking arm portions 351A. The shaft body portion 352, whose intermediate portion in the connector width direction is made thinner than the opposite end portions, with said intermediate portion accommodated within the shaft accommodating portions 314A of the side walls 314 of the housing 310, is adapted to be pivotable about a pivotal axis extending in the connector width direction. In addition, the shaft body portion 352 has its upward movement restricted by shaft restricting portions 371 of the hereinafter-described rear fittings 370.

The front fittings 360 and the rear fittings 370 are made by bending strip-shaped planar members in the through-thickness direction. As shown in FIG. 7 (B), the front fittings 360, which are located on opposite external sides of the terminal array range in the connector width direction, are retained in place by being molded integrally with the bottom wall 313 and the front end portions of the side walls 314 of the housing 310. The front fittings 360, which have front anchor portions 361 that project toward the front from the bottom wall 313, are adapted to have their bottom faces secured to the corresponding portions of the mounting face of the circuit board (not shown) using solder connections.

As shown in FIG. 7 (B), the rear fittings 370 are retained in place in the same positions in the connector width direction as the front fittings 360 by being molded integrally with the bottom wall 313 and the rear end portions of the side walls 314 of the housing 310. The rear fittings 370 have shaft body restricting portions 371 that extend throughout the range of the shaft accommodating portions 314A of the side walls 314 in the forward-backward direction. The shaft restricting portions 371 are located above the shaft body portion 352 of the movable member 350 accommodated within the shaft accommodating portions 314A and restrict the upward movement of the shaft body portion 352. In addition, the rear fittings 370, which have rear anchor portions 372 that project toward the rear from the bottom wall 313, are adapted to have their bottom faces secured to the corresponding portions of the mounting face of the circuit board (not shown) using solder connections.

The operation of insertion of the flat-type conductor into connector 301 is performed when the movable member 350 is in the closed position. In the process of insertion of the flat-type conductor, the front end of the flat-type conductor abuts the first contact portions 322A of the first terminals 320, the second contact portions 332A of the second terminals 330, and the engaging portions of the locking arm portions 351A of the movable member 350 from the rear, thereby causing the first contact arm portions 322, the second contact arm portions 332, and the locking arm portions 351A to be resiliently displaced upward under the action of the upward component of the abutment force, and the flat-type conductor moves further forward. Once the insertion of the flat-type conductor is complete, the first contact portions 322A and the second contact portions 332A are brought into contact with the circuits on the top face of the flat-type conductor under contact pressure from above. In addition, the flat-type conductor is prevented from decoupling due to the fact that the engaging portions of the locking arm portions 351A are located so as to permit engagement from the rear with the engageable portions of the flat-type conductor.

In addition, when the flat-type conductor is extracted, the movable member 350 is pivoted to the open position. As a result, the engaging portions of the locking arm portions 351A move upward, thereby disengaging said engaging portions from the engageable portions of the flat-type conductor and making it possible to extract the flat-type conductor from the connector 301 without difficulty by pulling on it in the rearward direction.

As shown in FIG. 8, in the present embodiment, the first contact portions 322A of the first terminals 320 are located on the interior side, i.e., on the front end side of the receiving space 311. Therefore, even if an attempt is made to emit light into the receiving space 311 from the rear and cause the light to be reflected rearward in the same manner as in the first embodiment when inspection images are captured upon completion of the connector 301, a sufficient quantity of light is unlikely to reach the interior of the receiving space 311 and it may be impossible to capture clear inspection images.

Accordingly, in the present embodiment, in which the emitting portion (not shown) of the inspection device is provided under the connector 301, and the imaging portion (not shown) of the inspection device is provided behind the connector 301, light is emitted by the emitting portion from below connector 301, said light is reflected rearward by the reflecting surface 315A-1 of the front wall 315, and inspection images are captured by the imaging portion from behind the connector 301. At such time, the emitting portion of the inspection device is provided under the front space 310A of the housing 310, and emits light from below into the opening portion 310A-1 or, more particularly, into the bottom end opening of the cutout space 310A-2. The emitted light is reflected rearward by the reflecting surface 315A-1 of the reflective portion 315A. The imaging portion of the inspection device captures inspection images of the connector 301 from the rear. A measuring portion of the inspection device (not shown) can then identify the location of the first contact portions 322A by analyzing the inspection images. Furthermore, it can measure the vertical dimensions of the gap 83 between the first contact portions 322A and the rear frame portion 313B.

In the present embodiment, the distance from the opening portion 310A-1 to the reflecting surface 315A-1 in the up-down direction is shorter than the distance from the rear end opening of the receiving space 311 to the reflecting surface 315A-1 in the forward-backward direction. Therefore, at the time of inspection, light emitted into the opening portion 310A-1 is more likely to reach the reflecting surface 315A-1, and a sufficient quantity of light can be reflected rearward even if the reflecting surface 315A-1 is made of an electrically insulating material. In addition, the reflecting surface 315A-1 is located so as to include the protruding ends (bottom ends) of the first contact portions 322A when viewed from the rear. Therefore, clear inspection images with high contrast between the first contact portions 322A and the reflecting surface 315A-1 can be captured by the imaging portion located behind the connector. As a result, it becomes easy to identify the location of the first contact portions 322A and the dimensions of the gap 83 can be accurately measured.

In addition, in the present embodiment, the bottom end of the reflecting surface 315A-1 is located at the same height as the top face of the rear frame portion 313B, in other words, the bottom end of the gap 83 in the up-down direction, and the reflecting surface 315A-1 is located so as to include the entire gap 83 in the up-down direction. Therefore, it becomes easier to identify the extent of the gap 83 in the inspection images and the dimensions of the gap 83 can be measured more accurately. In addition, if the reflecting surface 315A-1 is formed within a range that extends downwardly of the top face of the rear frame portion 313B, the reflecting surface 315A-1 is positioned in a manner that ensures inclusion of the location of the top face of the rear frame portion 313B in the up-down direction, and it becomes easier to identify the extent of the gap 83.

Although in the present embodiment the reflecting surface 315A-1 is located within a range that overlaps with the entire gap 83 in the up-down direction, if the location of the bottom end of the gap 83 can be easily identified, it is not essential for the reflecting surface to overlap with the entire gap 83 in the up-down direction. In such a case, for example, the reflecting surface 315A-1 may be located within a range that overlaps only with a portion of the gap 83 while including the protruding ends of the first contact portions 322A of the first terminals 320 when viewed from the rear. Providing the reflecting surface 315A-1 at such a location makes it easy to identify the location of the first contact portions 322A and allows for the dimensions of the gap 83 to be accurately measured.

Although examples, in which the present invention was applied to connectors 1, 101, 201, and 301 into and from which a flat-type conductor used as a counterpart connect body was inserted and extracted in a direction parallel to the circuit board, were provided in the first and second embodiments discussed above, connectors to which the present invention is applicable are not limited thereto. For example, the present invention is equally applicable to connectors into and from which a counterpart connect body is inserted and extracted in a direction perpendicular to the circuit board. In such a case, the direction of insertion and extraction perpendicular to the circuit board is the forward-backward direction, and the direction parallel to the circuit board and perpendicular to the connector width direction (terminal array direction) is the connector thickness direction.

DESCRIPTION OF THE REFERENCE NUMERALS

1, 101, 201, 301 Connector
10, 110, 310 Housing
11, 111, 311 Receiving space
11A, 111A, 211A Rear end opening
13A Mounting portion
20, 120, 320 First terminal
20A First shaft restricting portion
21 Base portion
22 Retained portion
23 Extension portion
23A, 136B-2A, 236B-2A, 315A Reflective portion
23A-1, 136B-2B, 236B-2B, 315A-1 Reflecting surface
24, 322 First contact arm portion
24A, 124A, 224A, 322A First contact portion
25B, 323 First connecting portion (anchor portion)
30, 130, 230, 330 Second terminal
31 Upper arm portion
32A Second shaft restricting portion
33, 133, 233, 332 Second contact arm portion
33A, 133A, 233A, 332A Second contact portion
34 Lower arm portion
36, 136, 236 Projecting arm portion
36B-1, 136B-1, 236B-1 Recess portion
36B-2, 136B-2, 236B-2 Front protrusion
36B-3, 136B-3, 236B-3 Rear protrusion
36C, 334 Second connecting portion (anchor portion)
37 Strut portion
40 Locking member
41 Upper arm portion
42 Pressure-receiving arm portion
42A Pressure-receiving portion
43 Locking arm portion
43A Engaging portion
44 Mountable portion
44A Upper clamping portion
44B Lower clamping portion
44C Coupling portion
45 Strut portion
46A Anchor portion
50, 350 Movable member
54 First shaft body portion
55 Second shaft body portion
56 Cam portion
56A Pressure-applying portion
310A Front space
310A-1 Opening portion
321 First base portion
C Flat-type conductor
C1 Connecting circuit
CIA First circuit
C1B Second circuit
C3A Engageable portion
O Pivotal center
δ1, δ2, δ3 Gap

The invention claimed is:

1. An electrical connector to which a counterpart connect body is forwardly connected such that the direction of insertion and extraction is the forward-backward direction, said electrical connector comprising a housing having formed therein a receiving space open toward the rear for receiving the counterpart connect body and multiple terminals that are arranged and retained in the housing such that the terminal array direction is a direction perpendicular to the forward-backward direction, wherein the terminals have a retained portion located forwardly of the receiving space and retained in the housing, and a contact arm portion that extends toward the rear from the retained portion;

the contact arm portion has a contact portion that protrudes toward the receiving space in the connector thickness direction perpendicular to the forward-backward direction and the terminal array direction and is capable of contacting the counterpart connect body;

the contact portion faces the interior surface of the receiving space across a gap in the connector thickness direction;

the terminals have an extension portion located forwardly of the contact portion;

the extension portion has a reflective portion in the rear end portion thereof;

the reflective portion has a rear end face within a range that includes the protruding end of the contact portion when viewed from the rear; and the rear end face is formed as a reflecting surface capable of rearwardly reflecting light emitted forwardly toward the receiving space.

2. The electrical connector according to claim 1, wherein the reflecting surface is formed within a range which, in addition to overlapping with the gap in the connector thickness direction, also includes the location of the interior surface of the receiving space that faces the contact portion.

3. An electrical connector to which a counterpart connect body is forwardly connected such that the direction of insertion and extraction is the forward-backward direction, said electrical connector comprising a housing having formed therein a receiving space open toward the rear for receiving the counterpart connect body, and multiple terminals that are arranged and in the housing such that the terminal array direction is a direction perpendicular to the forward-backward direction, wherein the terminals have two arm portions and strut portions with major faces perpendicular to the terminal array direction; the two arm portions are located so as to sandwich the receiving space in the connector thickness direction perpendicular to the forward-backward direction and the terminal array direction, and extend in the forward-backward direction in parallel with each other;

the strut portions extend in the connector thickness direction at locations forward of the receiving space and couple the two arm portions;

at least one arm portion has a protrusion that protrudes toward the receiving space; at least one protrusion is a contact portion capable of contacting the counterpart connect body;

either one of the arm portions has a reflective portion that protrudes toward the receiving space at a location forward of the protrusion;

the reflective portion has a rear end face within a range that includes the protruding end of the at least one protrusion when viewed from the rear; and the rear end face is formed as a reflecting surface capable of rearwardly reflecting light emitted forwardly toward the receiving space.

4. The electrical connector according to claim 3, wherein the protrusions are formed in each of the two arm portions;

one arm that has the reflective portion, in addition to having a recess portion open toward the receiving space, has the reflective portion at the location of the front end of the recess portion and has the protrusion at the location of the rear end of the recess portion; and the other arm portion has the protrusion within the bounds of the recess portion in the forward-backward direction.

5. The electrical connector according to claim 1, wherein the reflecting surface is formed as a surface perpendicular to the forward-backward direction.

6. An electrical connector to which a counterpart connect body is forwardly connected such that the direction of insertion and extraction is the forward-backward direction, said electrical connector comprising a housing having formed therein a receiving space open toward the rear for receiving the counterpart connect body, and multiple terminals that are arranged and retained in the housing such that the terminal array direction is a direction perpendicular to the forward-backward direction, wherein the terminals have a base portion located forwardly of the receiving space, and a contact arm portion that extends toward the rear from the base portion;

the contact arm portion has a contact portion that protrudes toward the receiving space in the connector thickness direction perpendicular to the forward-backward direction and the terminal array direction and is capable of contacting the counterpart connect body;

the contact portion faces the interior surface of the receiving space across a gap in the connector thickness direction;

the housing has formed therein a front space that is located forwardly of the receiving space and is in communication with the receiving space;

the front space has an opening portion open to the receiving space on the side opposite to the contact portion in the connector thickness direction and that communicates with the exterior through the opening portion;

the housing or the terminals have a reflective portion at a location overlapping with the opening portion when viewed through said opening portion;

the reflective portion has an inclined face inclined so as to approach the opening portion as one moves forward within a range that includes the protruding end of the contact portion when viewed from the rear; and the inclined face is formed as a reflecting surface capable of rearwardly reflecting light emitted into the opening portion.

7. The electrical connector according to claim 6, wherein the reflecting surface is formed within a range which, in addition to overlapping with the gap in the connector thickness direction, also includes the location of the interior surface of the receiving space that faces the contact portion.

* * * * *